(12) United States Patent
Li et al.

(10) Patent No.: US 11,653,412 B2
(45) Date of Patent: May 16, 2023

(54) DATA TRANSMISSION METHOD AND COMMUNICATIONS APPARATUS FOR COMMUNICATION OF DATA FROM DIFFERENT SERVICE TYPES OR DIFFERENT DESTINATION ADDRESSES

(71) Applicant: HUAWEI TECHNOLOGIES CO., LTD., Guangdong (CN)

(72) Inventors: Mingchao Li, Beijing (CN); Zhenzhen Cao, Beijing (CN); Hang Liu, Beijing (CN); Hejun Wang, Shenzhen (CN); Yinghui Yu, Beijing (CN); Xiao Xiao, Beijing (CN); Jinfang Zhang, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 223 days.

(21) Appl. No.: 17/023,121

(22) Filed: Sep. 16, 2020

(65) Prior Publication Data
US 2021/0007177 A1    Jan. 7, 2021

Related U.S. Application Data

(63) Continuation of application No. PCT/CN2019/078845, filed on Mar. 20, 2019.

(30) Foreign Application Priority Data

Mar. 20, 2018 (CN) .......................... 201810231491.9

(51) Int. Cl.
*H04W 4/40* (2018.01)
*H04W 76/14* (2018.01)
*H04W 80/02* (2009.01)
*H04W 80/08* (2009.01)

(52) U.S. Cl.
CPC ............. *H04W 80/02* (2013.01); *H04W 4/40* (2018.02); *H04W 76/14* (2018.02); *H04W 80/08* (2013.01)

(58) Field of Classification Search
CPC . H04L 1/0083; H04L 1/0084; H04L 12/4633; H04L 69/322; H04L 69/324;
(Continued)

(56) References Cited

U.S. PATENT DOCUMENTS

2009/0213799 A1    8/2009   Yeo et al.
2013/0114445 A1*   5/2013   Wen .................. H04W 72/1252
                                                              370/252
(Continued)

FOREIGN PATENT DOCUMENTS

CN    1921346 A     2/2007
CN    101166193 A   4/2008
(Continued)

OTHER PUBLICATIONS

CATT, MAC Model in NR. 3GPP TSG-RAN WG2 Meeting #96, Reno, USA, Nov. 14-18, 2016, R2-167950, 4 pages.
(Continued)

*Primary Examiner* — Melvin C Marcelo
*Assistant Examiner* — Natali Pascual Peguero
(74) *Attorney, Agent, or Firm* — Womble Bond Dickinson (US) LLP

(57) ABSTRACT

This application provides a data transmission method and communications apparatus, to improve transmission efficiency. The method may include obtaining, by a MAC entity of a first communications device from an upper layer, first data on each of at least one first logical channel and second data on each of at least one second logical channel, where a service type or a destination address of the first data is different from a service type or a destination address of the
(Continued)

second data. The method may also include generating, by the first communications device, a MAC PDU, where the MAC PDU includes the first data on each first logical channel and the second data on each second logical channel; and sending, by the first communications device, the MAC PDU through a direct link.

14 Claims, 14 Drawing Sheets

(58) Field of Classification Search
CPC .... H04L 67/12; H04L 69/321; H04W 28/065; H04W 4/40; H04W 76/11; H04W 76/14; H04W 80/02; H04W 80/08; H04W 24/02
See application file for complete search history.

(56) References Cited

U.S. PATENT DOCUMENTS

| | | |
|---|---|---|
| 2013/0294322 A1 | 11/2013 | Yun et al. |
| 2014/0334384 A1 | 11/2014 | Pani et al. |
| 2015/0257187 A1 | 9/2015 | Kwon |
| 2015/0358838 A1* | 12/2015 | Wei ................... H04W 28/0278 370/228 |
| 2018/0077624 A1* | 3/2018 | Jung ....................... H04W 8/08 |

FOREIGN PATENT DOCUMENTS

| | | | |
|---|---|---|---|
| CN | 101394338 A | 3/2009 | |
| CN | 104768206 A | 7/2015 | |
| CN | 104936226 A | 9/2015 | |
| CN | 107734606 A | 2/2018 | |
| EP | 1675323 B1 | 2/2013 | |
| JP | 2008211759 A * | 9/2008 | ........... H04L 5/0007 |
| WO | WO-2011097812 A1 * | 8/2011 | ............. H04L 5/001 |

OTHER PUBLICATIONS

3GPP TS 22.186 V15.2.0 (Sep. 2017), 3rd Generation Partnership Project;Technical Specification Group Services and System Aspects;Enhancement of 3GPP support for V2X scenarios; Stage 1 (Release 15), 16 pages.

\* cited by examiner

| First MAC subheader | First MAC subheader | First data | First data | ... | ... | Second MAC subheader | Second MAC subheader | Second data | Second data | ... |

FIG. 6

| ... | First MAC subheader | First MAC subheader | Second MAC subheader | Second MAC subheader | First data | First data | ... | First data | Second data | Second data |

FIG. 7

| Version 1 | SRC | DST 1 | MAC CE | Sub PDU 1 | Sub PDU 2 | DST 2 | MAC CE | Sub PDU 1 |
FIG. 11
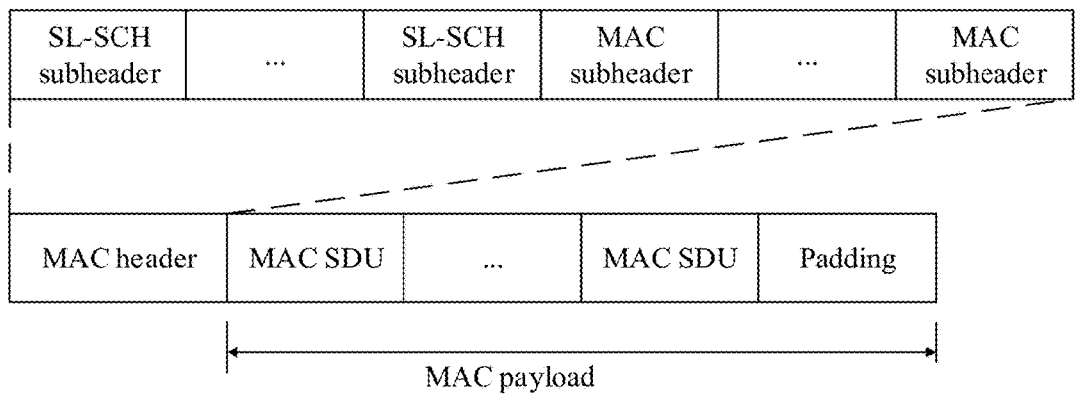
FIG. 12
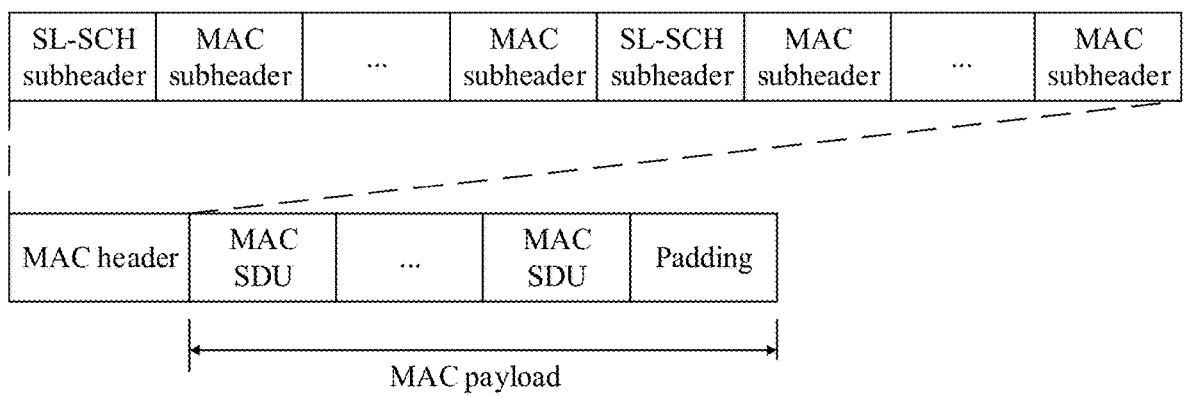
FIG. 13

DATA TRANSMISSION METHOD AND COMMUNICATIONS APPARATUS FOR COMMUNICATION OF DATA FROM DIFFERENT SERVICE TYPES OR DIFFERENT DESTINATION ADDRESSES

CROSS-REFERENCE TO RELATED APPLICATIONS

This application is a continuation of International Application No. PCT/CN2019/078845, filed on Mar. 20, 2019, which claims priority to Chinese Patent Application No. 201810231491.9, filed on Mar. 20, 2018. The disclosures of the aforementioned applications are hereby incorporated by reference in their entireties.

TECHNICAL FIELD

This application relates to the communications field, and more specifically, to a data transmission method and communications apparatus.

BACKGROUND

Currently, a vehicle may obtain road condition information or receive an information service in a timely manner through vehicle-to-vehicle (V2V) communication, vehicle-to-infrastructure (V2I) communication, vehicle-to-pedestrian (V2P) communication, or vehicle-to-network. (V2N) communication. These communication modes may be collectively referred to as V2X communication (where X represents everything). A network used for the V2X communication is referred to as internet of vehicles. Cellular-network-based internet of vehicles communication is a current important communication means, for example, V2X direct communication that is based on long term evolution (LTE) or 5th generation (5G) new radio (NR).

In the existing V2X direct communication that is based on LTE, an access stratum of a terminal obtains data of different service types from an upper-layer application. Data of each service type has a different destination address, and a destination address may be represented by a destination identifier (ID). Service data having different destination addresses is mapped to different logical channels. If services having a same destination address have different send priority identifiers (referred to as PPPP), data having different priority identifiers is also mapped to different logical channels. In brief, data on a logical channel needs to have a same {destination ID, PPPP} combination identifier. When at least one logical channel of a transmit end has data to be sent, a media access control (MAC) layer obtains data from different logical channels, then encapsulates the data into a MAC protocol data unit (PDU), and finally sends the MAC PDU to a receive end. In the prior art, when a transmit end has data to be sent, a MAC layer selects a service type of the data to be sent, and then selects data on one or more logical channels having the service type for encapsulation. Based on a current encapsulation format design, data of only one destination address is allowed to be encapsulated into one MAC PDU, and only data having a same destination address is allowed to be encapsulated into the MAC PDU.

With the development of technologies such as self-driving, a vehicle may exchange information such as a vehicle speed, a driving direction, and a specific location of the vehicle, and whether an emergence brake is stepped on with surrounding vehicles through V2X direct communication, and may further share sensor data, video data, map data, and the like with the surrounding vehicles. Compared with conventional V2X services, services of this type have a larger data volume and have requirements of a lower transmission latency and a higher data rate. When the transmit end buffers a plurality of services of this type, data needs to be sent as soon as possible.

SUMMARY

In the background, one MAC PDU can store data of only one service type, and a transmit end can only select different resources to send data of different service types. A mechanism of separately encapsulating data of a single service type reduces transmission efficiency, and selecting the resources for the data of the different service types causes latency overheads. Therefore, a current MAC PDU design cannot meet low-latency and high-rate requirements of a V2X service. In view of this, this application provides a data transmission method and communications apparatus, to improve transmission efficiency.

According to a first aspect, an embodiment of this application provides a data transmission method. The method includes:

obtaining, by a media access control (MAC) entity of a first communications device from an upper layer, first data on each of at least one first logical channel and second data on each of at least one second logical channel, where a service type or a destination address of the first data is different from a service type or a destination address of the second data;

generating, by the first communications device, a MAC protocol data unit (PDU), where the MAC PDU includes the first data on each first logical channel and the second data on each second logical channel; and sending, by the first communications device, the MAC PDU through a direct link.

It should be understood that the first data and the second data are two types of data, and the service type or the destination address of the first data is different from the service type or the destination address of the second data. For example, the first data and the second data may belong to different flows, different bearers, or different groups, or transmission requirements of the first data and the second data are different. It should be understood that service types or destination addresses of two types of data that belong to different flows, different bearers, or different groups, or have different transmission requirements are also different.

It should be further understood that the first data on various first logical channel may be the same or may be different. Similarly, the second data on various second logical channel may be the same or may be different. Both a quantity of first logical channels and a quantity of second logical channels may be greater than or equal to 1, and the quantity of first logical channels and the quantity of second logical channels may be the same or may be different.

According to the method in this embodiment of this application, data of different service types or different destination addresses is encapsulated into one MAC PDU, so that latency overheads caused by separately encapsulating data of a single service type or a single destination address and latency overheads caused by selecting resources for the data of the different service types or destination addresses can be avoided, thereby improving transmission efficiency.

With reference to the first aspect, in some embodiments of the first aspect, the MAC PDU includes a first identifier and a second identifier, the first identifier is used to indicate the service type or the destination address of the first data, and the second identifier is used to indicate the service type or the destination address of the second data.

Optionally, the first identifier is any one or more of the following associated with the first data:

a first service type identifier, a first flow identifier, a first bearer identifier, a first group identifier, a first destination address identifier, and a first transmission requirement identifier; and the second identifier is any one or more of the following associated with the second data:

a second service type identifier, a second flow identifier, a second bearer identifier, a second group identifier, a second destination address identifier, and a second transmission requirement identifier.

Specifically, the first identifier may explicitly or implicitly indicate the service type or the destination address of the first data. For example, the first identifier may be the first service type identifier associated with the first data, so that the first identifier may explicitly indicate the service type of the first data. For another example, the first identifier may be the first destination address identifier associated with the first data, so that the first identifier explicitly indicates the destination address of the first data. For still another example, the first identifier may be the first flow identifier, the first bearer identifier, the first group identifier, or the first transmission requirement identifier associated with the first data, so that the first identifier may implicitly indicate the service type or the destination address of the first data. Similarly, the second identifier may explicitly or implicitly indicate the service type or the destination address of the second data. For example, the second identifier may be the second service type identifier associated with the second data, so that the second identifier may explicitly indicate the service type of the second data. For another example, the second identifier may be the second destination address identifier associated with the second data, so that the second identifier explicitly indicates the destination address of the second data. For still another example, the second identifier may be the second flow identifier, the second bearer identifier, the second group identifier, or the second transmission requirement identifier associated with the second data, so that the second identifier may implicitly indicate the service type or the destination address of the second data. It should be understood that the first identifier may be a plurality of identifiers in the foregoing identifiers associated with the first data. In other words, the first identifier includes the plurality of identifiers in the foregoing identifiers associated with the first data. The second identifier is similar, and details are not described herein again.

In addition, the foregoing transmission requirement may be a latency, reliability, or the like, and a transmission requirement identifier may be a latency identifier, a reliability identifier, or the like. A specific parameter used to represent the transmission requirement is not limited in this application.

With reference to the first aspect, in some embodiments of the first aspect, the MAC PDU includes a first unit and a second unit, all content of the first unit is located before or behind the second unit, the first unit includes the first identifier and the first data that is on each first logical channel, and the second unit includes the second identifier and the second data that is on each second logical channel.

To be specific, each of the first unit and the second unit is a whole, and there is no overlapping part between the first unit and the second unit. That the first unit is located before the second unit may be understood as that after receiving the MAC PUD, a receive end first reads the first unit and then reads the second unit.

According to the data transmission method in this embodiment of this application, the first data and the second data are separately encapsulated as a whole, so that the receive end can decapsulate the MAC PDU after receiving the first unit or the second unit, without a need to wait until all data in the MAC PDU is received. Therefore, decapsulation efficiency of the receive end can be improved.

With reference to the first aspect, in some embodiments of the first aspect, the first unit is located before the second unit, and the MAC PDU further includes a MAC control element; and when the MAC control element (CE) is included in the first unit, the MAC control element is valid for at least one second communications device corresponding to the first identifier; or when the MAC control element is included in the second unit, the MAC control element is valid for at least one third communications device corresponding to the second identifier; or when the MAC control element is not included in the first unit and the second unit, the MAC control element is valid for both at least one second communications device and at least one third communications device; or when the MAC control element is not included in the first unit and the second unit, the MAC control element is valid for all communications devices that receive the MAC PDU.

With reference to the first aspect, in some embodiments of the first aspect, the MAC PDU includes at least one first MAC subheader and at least one second MAC subheader, the at least one first MAC subheader is in a one-to-one correspondence with at least one piece of first data on the at least one first logical channel, and the at least one second MAC subheader is in a one-to-one correspondence with at least one piece of second data on the at least one second logical channel; and the generating, by the first communications device, a MAC protocol data unit PDU includes:

generating, by the first communications device, the MAC PDU by adjacently encapsulating the first data and a MAC subheader corresponding to the first data into the MAC PDU, and/or by adjacently encapsulating the second data and a MAC subheader corresponding to the second data into the MAC PDU; or generating, by the first communications device, the MAC PDU by adjacently encapsulating the at least one first MAC subheader into the MAC PDU and adjacently encapsulating the at least one piece of first data into the MAC PDU, and/or by adjacently encapsulating the at least one second MAC subheader into the MAC PDU and adjacently encapsulating the at least one piece of second data into the MAC PDU.

With reference to the first aspect, in some embodiments of the first aspect, the MAC PDU includes a third identifier and/or a fourth identifier, and the third identifier and/or the fourth identifier are/is used to indicate an identity or an address of the first communications device; and the generating, by the first communications device, a MAC protocol data unit PDU includes:

generating, by the first communications device, the MAC PDU by encapsulating both the third identifier corresponding to the first data and the fourth identifier corresponding to the second data into the MAC PDU; or generating, by the first communications device, the MAC PDU by encapsulating the third identifier or the fourth identifier into the MAC PDU.

With reference to the first aspect, in some embodiments of the first aspect, the MAC PDU includes a fifth identifier and/or a sixth identifier; and the generating, by the first communications device, a MAC protocol data unit PDU includes:

generating, by the first communications device, the MAC PDU by encapsulating the fifth identifier or the sixth identifier into the MAC PDU, where the fifth identifier or the sixth identifier is used to indicate a format type of the MAC PDU; or generating, by the first communications device, the MAC PDU by encapsulating the fifth identifier or the sixth identifier into the MAC PDU, where the fifth identifier or the sixth identifier is used to indicate a format type of an adjacent address field behind the fifth identifier or the sixth identifier in the MAC PDU; or generating, by the first communications device, the MAC PDU by encapsulating both the fifth identifier and the sixth identifier into the MAC PDU, where the fifth identifier is used to indicate a format type of an address field corresponding to the first data, and the sixth identifier is used to indicate a format type of an address field corresponding to the second data.

Specifically, if the fifth identifier or the sixth identifier is encapsulated into the MAC PDU, the fifth identifier or the sixth identifier is used to indicate the format type of the MAC PDU, or indicate the format type of the adjacent address field behind the fifth identifier or the sixth identifier in the MAC PDU. That the fifth identifier or the sixth identifier is used to indicate the format type of the MAC PDU means that the fifth identifier or the sixth identifier is used to indicate a format of the MAC PDU, or in other words, a specific meaning respectively represented by each bit in the MAC PDU. That the fifth identifier or the sixth identifier is used to indicate the format type of the adjacent address field behind the fifth identifier or the sixth identifier in the MAC PDU means that the fifth identifier or the sixth identifier is used to indicate a specific meaning respectively represented by each bit in the adjacent address field behind the fifth identifier or the sixth identifier. For example, if the adjacent address field behind the fifth identifier or the sixth identifier is a MAC subheader, the fifth identifier or the sixth identifier represents a meaning represented by each bit in the MAC subheader.

Alternatively, if both the fifth identifier and the sixth identifier are encapsulated into the MAC PDU, the fifth identifier is used to indicate the format type of the address field corresponding to the first data, and the sixth identifier is used to indicate the format type of the address field corresponding to the second data. Optionally, the format type of the address field corresponding to the first data may be a format type of an address field, in the MAC PDU, corresponding to the first identifier corresponding to the first data. Optionally, the format type of the address field corresponding to the second data may be a format type of an address field, in the MAC PDU, corresponding to the second identifier corresponding to the second data.

It should be understood that the fifth identifier and the sixth identifier may be the same or may be different. This is not limited in this embodiment of this application.

Further, the format type is any one of the following:

a unicast format type, a multicast format type, a broadcast format type, a vehicle platooning service format type, a control information format type, a data format type, a MAC CE, and a fixed protocol version format type.

Optionally, the MAC CE may be a common MAC CE or a dedicated MAC CE. The common MAC CE is valid for all receive ends that receive the MAC PDU, or the common MAC CE is valid for receive ends that receive the MAC PDU and that correspond to the first identifier and the second identifier. The dedicated MAC CE is valid only for a receive end corresponding to the first identifier or the second identifier associated with the dedicated MAC CE.

With reference to the first aspect, in some embodiments of the first aspect, the MAC PDU includes a seventh identifier and/or an eighth identifier, the seventh identifier is used to indicate a quantity of first logical channels that is included in the MAC PDU or a quantity of pieces of first data that is included in the MAC PDU, and the eighth identifier is used to indicate a quantity of second logical channels that is included in the MAC PDU or a quantity of pieces of second data that is included in the MAC PDU.

With reference to the first aspect, in some embodiments of the first aspect, the first MAC subheader includes a ninth identifier, and the ninth identifier is used to indicate whether a first MAC subheader or first data is further encapsulated behind the first MAC subheader or the first data; and/or the second MAC subheader includes a tenth identifier, and the tenth identifier is used to indicate whether a second MAC subheader or second data is further encapsulated behind the second MAC subheader or the second data.

With reference to the first aspect, in some embodiments of the first aspect, the generating, by the first communications device, a MAC protocol data unit PDU includes:

generating, by the first communications device, the MAC PDU by preferentially encapsulating, into the MAC PDU, data whose latency requirement is less than or equal to a first threshold in the at least one piece of first data on the at least one first logical channel and the at least one piece of second data on the at least one second logical channel; or generating, by the first communications device, the MAC PDU by preferentially encapsulating, into the MAC PDU, data whose latency requirement is less than or equal to a second threshold in the at least one piece of first data on the at least one first logical channel; or generating, by the first communications device, the MAC PDU by preferentially encapsulating the at least one piece of first data on the at least one first logical channel into the MAC PDU.

According to a second aspect, an embodiment of this application provides a data transmission method. The method includes:

receiving, by a receive end, a MAC protocol data unit PDU through a direct link, where the MAC PDU includes first data on each of at least one first logical channel and second data on each of at least one second logical channel, and a service type or a destination address of the first data is different from a service type or a destination address of the second data; and decapsulating, by the receive end, the MAC PDU.

It should be understood that the first data and the second data are two types of data, and the service type or the destination address of the first data is different from the service type or the destination address of the second data. For example, the first data and the second data may belong to different flows, different bearers, or different groups, or transmission requirements of the first data and the second data are different. It should be understood that service types or destination addresses of two types of data that belong to different flows, different bearers, or different groups, or have different transmission requirements are also different.

It should be further understood that the first data on various first logical channel may be the same or may be different. Similarly, the second data on various second logical channel may be the same or may be different. Both a quantity of first logical channels and a quantity of second logical channels may be greater than or equal to 1, and the quantity of first logical channels and the quantity of second logical channels may be the same or may be different.

It should be understood that the first data and/or the second data are/is data of a specific receive end. To be specific, for the specific receive end, the specific receive end can decapsulate only the first data, or can encapsulate only the second data, or can decapsulate both the first data and the second data.

According to the method in this embodiment of this application, data of different service types or different destination addresses is encapsulated into one MAC PDU, so that latency overheads caused by separately encapsulating data of a single service type or a single destination address and latency overheads caused by selecting resources for the data of the different service types or destination addresses can be avoided, thereby improving transmission efficiency.

With reference to the second aspect, in some embodiments of the second aspect, the MAC PDU includes a first identifier and a second identifier, the first identifier is used to indicate the service type or the destination address of the first data, and the second identifier is used to indicate the service type or the destination address of the second data.

Optionally, the first identifier is any one or more of the following associated with the first data:

a first service type identifier, a first flow identifier, a first bearer identifier, a first group identifier, a first destination address identifier, and a first transmission requirement identifier; and the second identifier is any one or more of the following associated with the second data:

a second service type identifier, a second flow identifier, a second bearer identifier, a second group identifier, a second destination address identifier, and a second transmission requirement identifier.

In addition, the foregoing transmission requirement may be a latency, reliability, or the like, and a transmission requirement identifier may be a latency identifier, a reliability identifier, or the like. A specific parameter used to represent the transmission requirement is not limited in this application.

With reference to the second aspect, in some embodiments of the second aspect, the MAC PDU includes a first unit and a second unit, all content of the first unit is located before or behind the second unit, the first unit includes the first identifier and the first data that is on each first logical channel, and the second unit includes the second identifier and the second data that is on each second logical channel.

To be specific, each of the first unit and the second unit is a whole, and there is no overlapping part between the first unit and the second unit. That the first unit is located before the second unit may be understood as that after receiving the MAC PUD, the receive end first reads the first unit and then reads the second unit.

According to the data transmission method in this embodiment of this application, the first data and the second data are separately encapsulated as a whole, so that the receive end can decapsulate the MAC PDU after receiving the first unit or the second unit, without a need to wait until all data in the MAC PDU is received. Therefore, decapsulation efficiency of the receive end can be improved.

With reference to the second aspect, in some embodiments of the second aspect, the first unit is located before the second unit, and the MAC PDU further includes a MAC control element; and when the MAC control element is included in the first unit, the MAC control element is valid for at least one second communications device corresponding to the first identifier; or when the MAC control element is included in the second unit, the MAC control element is valid for at least one third communications device corresponding to the second identifier; or when the MAC control element is not included in the first unit and the second unit, the MAC control element is valid for both at least one second communications device and at least one third communications device; or when the MAC control element is not included in the first unit and the second unit, the MAC control element is valid for all communications devices that receive the MAC PDU.

With reference to the second aspect, in some embodiments of the second aspect, the MAC PDU includes at least one first MAC subheader and at least one second MAC subheader, the at least one first MAC subheader is in a one-to-one correspondence with at least one piece of first data on the at least one first logical channel, and the at least one second MAC subheader is in a one-to-one correspondence with at least one piece of second data on the at least one second logical channel; and the first data and a MAC subheader corresponding to the first data are adjacently encapsulated into the MAC PDU, and/or the second data and a MAC subheader corresponding to the second data are adjacently encapsulated into the MAC PDU; or the at least one first MAC subheader is adjacently encapsulated into the MAC PDU and the at least one piece of first data is adjacently encapsulated into the MAC PDU; and/or the at least one second MAC subheader is adjacently encapsulated into the MAC PDU and the at least one piece of second data is adjacently encapsulated into the MAC PDU.

With reference to the second aspect, in some embodiments of the second aspect, the MAC PDU includes a third identifier and/or a fourth identifier, and the third identifier and/or the fourth identifier are/is used to indicate an identity or an address of the first communications device; and both the third identifier corresponding to the first data and the fourth identifier corresponding to the second data are encapsulated into the MAC PDU; or the third identifier or the fourth identifier is encapsulated into the MAC PDU.

With reference to the second aspect, in some embodiments of the second aspect, the MAC PDU includes a fifth identifier and/or a sixth identifier; and the fifth identifier or the sixth identifier is encapsulated into the MAC PDU, and the fifth identifier or the sixth identifier is used to indicate a format type of the MAC PDU; or the fifth identifier or the sixth identifier is encapsulated into the MAC PDU, and the fifth identifier or the sixth identifier is used to indicate a format type of an adjacent address field behind the fifth identifier or the sixth identifier in the MAC PDU; or both the fifth identifier and the sixth identifier are encapsulated into the MAC PDU, the fifth identifier is used to indicate a format type of an address field corresponding to the first data, and the sixth identifier is used to indicate a format type of an address field corresponding to the second data.

Specifically, if the fifth identifier or the sixth identifier is encapsulated into the MAC PDU, the fifth identifier or the sixth identifier is used to indicate the format type of the MAC PDU, or indicate the format type of the adjacent address field behind the fifth identifier or the sixth identifier in the MAC PDU. That the fifth identifier or the sixth identifier is used to indicate the format type of the MAC PDU means that the fifth identifier or the sixth identifier is used to indicate a format of the MAC PDU, or in other words, a specific meaning respectively represented by each bit in the MAC PDU. That the fifth identifier or the sixth identifier is used to indicate the format type of the adjacent address field behind the fifth identifier or the sixth identifier in the MAC PDU means that the fifth identifier or the sixth identifier is used to indicate a specific meaning respectively represented by each bit in the adjacent address field behind the fifth identifier or the sixth identifier. For example, if the adjacent address field behind the fifth identifier or the sixth identifier is a MAC subheader, the fifth identifier or the sixth identifier represents a meaning represented by each bit in the MAC subheader.

Alternatively, if both the fifth identifier and the sixth identifier are encapsulated into the MAC PDU, the fifth identifier is used to indicate the format type of the address field corresponding to the first data, and the sixth identifier is used to indicate the format type of the address field corresponding to the second data.

Optionally, the format type of the address field corresponding to the first data may be a format type of an address field, in the MAC PDU, corresponding to the first identifier corresponding to the first data. Optionally, the format type of the address field corresponding to the second data may be a format type of an address field, in the MAC PDU, corresponding to the second identifier corresponding to the second data.

It should be understood that the fifth identifier and the sixth identifier may be the same or may be different. This is not limited in this embodiment of this application.

Further, the format type is any one of the following:

a unicast format type, a multicast format type, a broadcast format type, a vehicle platooning service format type, a control information format type, a data format type, a MAC CE, and a fixed protocol version format type.

Optionally, the MAC CE may be a common MAC CE or a dedicated MAC CE. The common MAC CE is valid for all receive ends that receive the MAC PDU, or the common MAC CE is valid for receive ends that receive the MAC PDU and that correspond to the first identifier and the second identifier. The dedicated MAC CE is valid only for a receive end corresponding to the first identifier or the second identifier associated with the dedicated MAC CE.

With reference to the second aspect, in some embodiments of the second aspect, the MAC PDU includes a seventh identifier and/or an eighth identifier, the seventh identifier is used to indicate a quantity of first logical channels that is included in or a quantity of pieces of first data that is included in the MAC PDU, and the eighth identifier is used to indicate a quantity of second logical channels that is included in or a quantity of pieces of second data that is included in the MAC PDU.

With reference to the second aspect, in some embodiments of the second aspect, the first MAC subheader includes a ninth identifier, and the ninth identifier is used to indicate whether a first MAC subheader or first data is further encapsulated behind the first MAC subheader or the first data; and/or the second MAC subheader includes a tenth identifier, and the tenth identifier is used to indicate whether a second MAC subheader or second data is further encapsulated behind the second MAC subheader or the second data.

With reference to the second aspect, in some embodiments of the second aspect, data whose latency requirement is less than or equal to a first threshold in the at least one piece of first data on the at least one first logical channel and the at least one piece of second data on the at least one second logical channel is preferentially encapsulated into the MAC PDU; or data whose latency requirement is less than or equal to a second threshold in the at least one piece of first data on the at least one first logical channel is preferentially encapsulated into the MAC PDU; or the at least one piece of first data on the at least one first logical channel is preferentially encapsulated into the MAC PDU.

For the second aspect, refer to the description of the first aspect. For brevity, details are not described herein again.

According to a third aspect, this application provides a data transmission communications apparatus. The communications apparatus includes a unit configured to perform the method in any one of the first aspect or the possible embodiments of the first aspect. The unit included in the communications apparatus may be implemented by software and/or hardware.

According to a fourth aspect, this application provides a data transmission communications apparatus. The communications apparatus includes a unit configured to perform the method in any one of the second aspect or the possible embodiments of the second aspect. The unit included in the communications apparatus may be implemented by software and/or hardware.

According to a fifth aspect, this application provides a communications device. The communications device includes at least one processor and a communications interface. The communications interface is used by the communications device to exchange information with another communications device. When a program instruction is executed by the at least one processor, the method in any one of the first aspect or the possible embodiments of the first aspect is implemented.

Optionally, the communications device may further include a memory. The memory is configured to store a program and data.

Optionally, the communications device may be a vehicle in a V2X system.

According to a sixth aspect, this application provides a communications device. The communications device includes at least one processor and a communications interface. The communications interface is used by the communications device to exchange information with another communications device. When a program instruction is executed by the at least one processor, the method in any one of the second aspect or the possible embodiments of the second aspect is implemented.

Optionally, the communications device may further include a memory. The memory is configured to store a program and data.

Optionally, the communications device may be a vehicle in a V2X system.

According to a seventh aspect, this application provides a computer-readable storage medium. The computer-readable storage medium stores program code for being executed by a communications device. The program code includes an instruction used to perform the method in any one of the foregoing aspects or the possible embodiments of the foregoing aspects.

For example, the computer-readable medium may store program code for being executed by a first communications device, and the program code includes an instruction used to perform the method in any one of the first aspect or the possible embodiments of the first aspect.

For example, the computer-readable medium may store program code for being executed by a receive end (for example, a second communications device or a third communications device), and the program code includes an instruction used to perform the method in any one of the second aspect or the possible embodiments of the second aspect.

According to an eighth aspect, this application provides a computer program product including an instruction. When the computer program product runs on a communications device, the communications device is enabled to execute an instruction of the method in any one of the foregoing aspects or the possible embodiments of the foregoing aspects.

For example, when the computer program product is executed on a first communications device, the first communications device is enabled to execute an instruction of the method in any one of the first aspect or the possible embodiments of the first aspect.

For example, when the computer program product is executed on a receive end (for example, a second communications device or a third communications device), the receive end is enabled to execute an instruction of the method in any one of the second aspect or the possible embodiments of the second aspect.

According to a ninth aspect, this application provides a system chip. The system chip includes an input/output interface and at least one processor, and the at least one processor is configured to invoke an instruction in a memory, to perform an operation of the method in any one of the foregoing aspects or the possible embodiments of the foregoing aspects.

Optionally, the system chip may further include at least one memory and a bus, and the at least one memory is configured to store the instruction executed by the processor.

BRIEF DESCRIPTION OF DRAWINGS

FIG. 4 to FIG. 14 are respectively schematic diagrams of a format of a MAC PDU according to an embodiment of this application;

DESCRIPTION OF EMBODIMENTS

The following describes the technical solutions of this application with reference to the accompanying drawings.

The technical solutions of embodiments of this application may be applied to various communications systems, such as: a global system for mobile communications (GSM) system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunication system (UMTS), a worldwide interoperability for microwave access (WiMAX) communications system, a 5th generation (5G) system, or a new radio (NR) system.

A terminal device in the embodiments of this application may be referred to as user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The terminal device may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a 5G network, a terminal device in a future evolved public land mobile network (PLMN), or the like. This is not limited in the embodiments of this application.

A network device in the embodiments of this application may be a device configured to communicate with a terminal device. The network device may be a base transceiver station (BTS) in a global system for mobile communications (GSM) or a code division multiple access (CDMA) system, or may be a NodeB (NB) in a wideband code division multiple access (WCDMA) system, or may be an evolved NodeB (eNB, eNodeB, or the like) in an LTE system, or may be a radio controller in a scenario of a cloud radio access network (CRAN). Alternatively, the network device may be a relay node, an access point, a vehicle-mounted device, a wearable device, a network device in a future 5G network, a network device in a future evolved PLMN network, or the like. This is not limited in the embodiments of this application.

Figure 1:
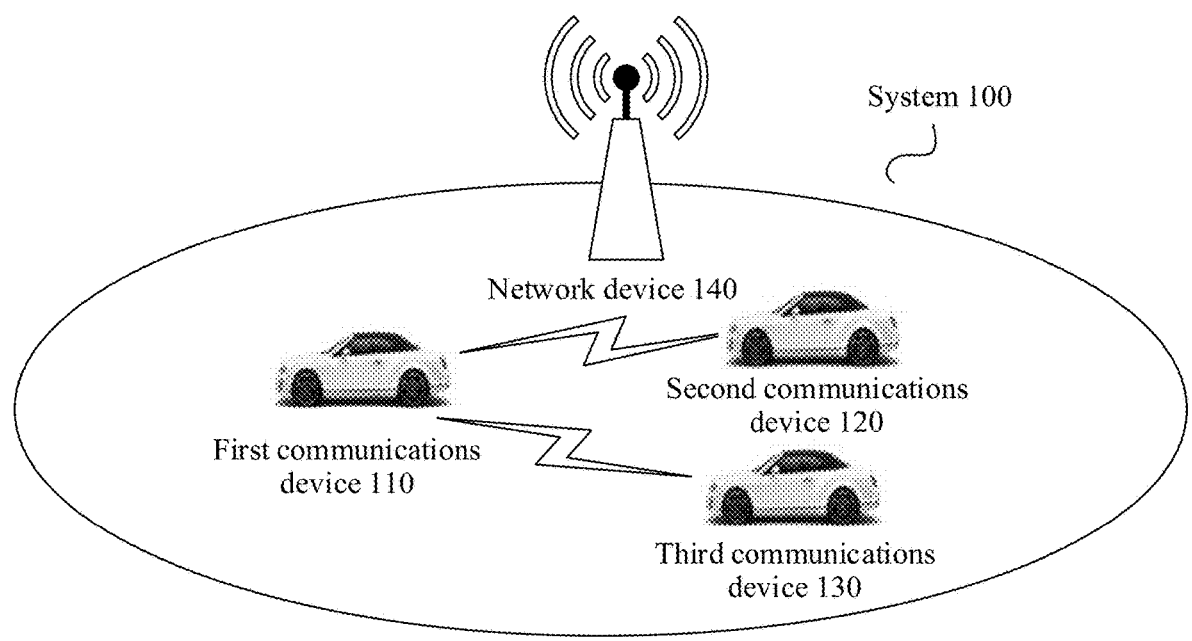
FIG. 1 is a schematic block diagram of a communications system to which embodiments of this application are applicable.

For ease of understanding the embodiments of this application, a communications system to which the embodiments of this application are applicable is first briefly described with reference to FIG. 1. FIG. 1 is a schematic diagram of a system 100 to which a data transmission method in embodiments of this application is applicable. The system shown in FIG. 1 may be a V2X direct communications system. As shown in FIG. 1, the communications system 100 includes at least three communications devices, for example, a first communications device 110, a second communications device 120, and a third communications device 130. The first communications device 110 may communicate with the second communications device 120 through a direct link, and the first communications device 110 may communicate with the third communications device 130 through a direct link. In other words, the first communications device 110 and the second communications device 120 may directly communicate with each other without a need of forwarding on a network side. The first communications device 110 and the third communications device 130 may directly communicate with each other without a need of forwarding on a network side. Optionally, the system 100 may further include a network device 140, and the network device 140 may perform data communication with each communications device by using a wireless connection.

The following describes in detail the data transmission method in the embodiments of this application with reference to FIG. 2 to FIG. 18.

According to the method in the embodiments of this application, a transmit end may encapsulate data of two or more service types or different destination addresses into one MAC PDU. For ease of understanding and description, the following merely uses an example in which data of two service types or different destination addresses is encapsulated into one MAC PDU for description.

Figure 2:
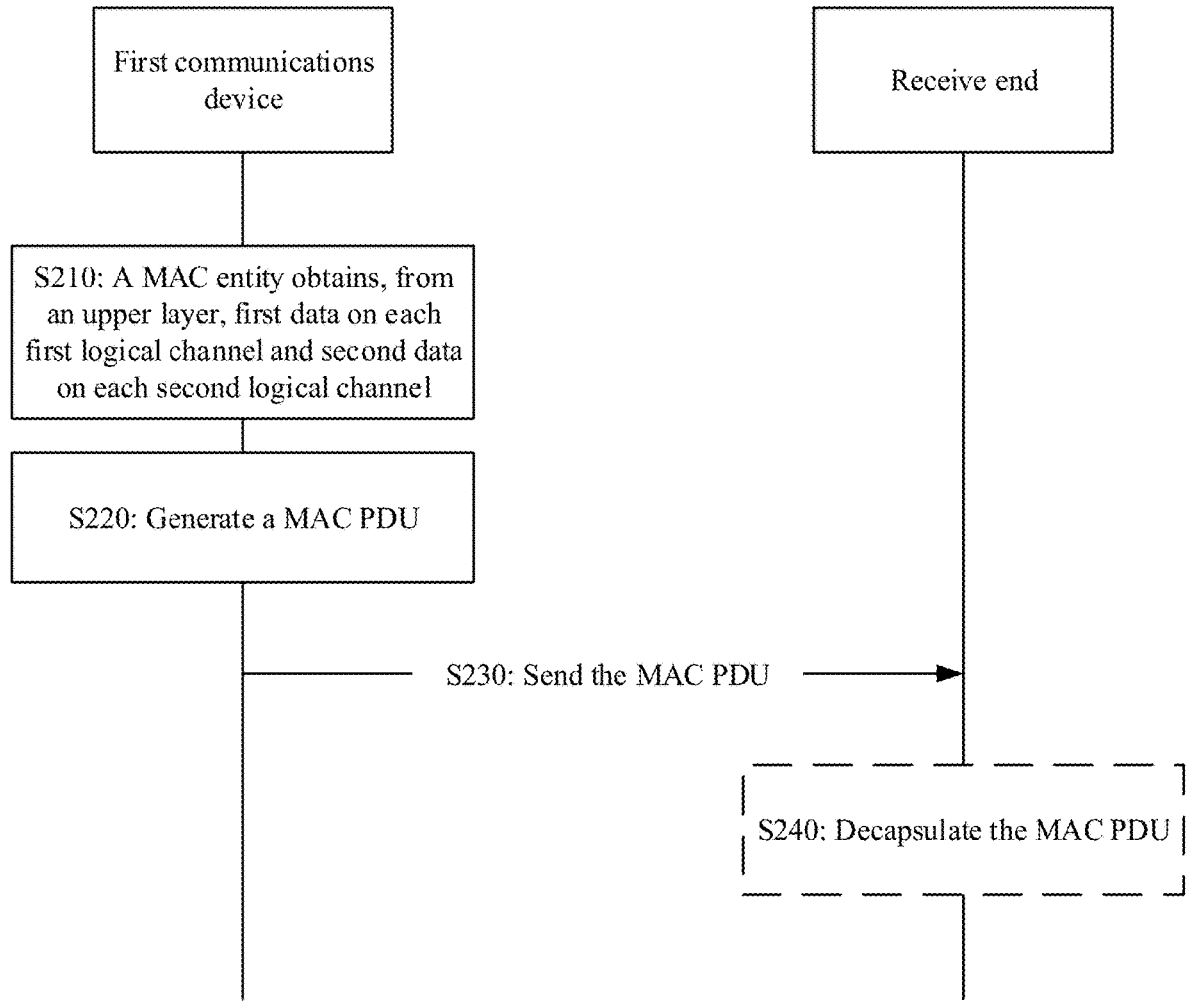
FIG. 2 is a schematic flowchart of a data transmission method according to an embodiment of this application.

FIG. 2 is a schematic flowchart of a data transmission method according to an embodiment of this application. As shown in FIG. 2, the method mainly includes S210 to S230. Optionally, the method may further include S240.

S210: A MAC entity of a first communications device obtains, from an upper layer, first data on each of at least one first logical channel and second data on each of at least one second logical channel, where a service type or a destination address of the first data is different from a service type or a destination address of the second data.

S220: The first communications device generates a MAC protocol data unit PDU, where the MAC PDU includes the first data on each first logical channel and the second data on each second logical channel.

S230: The first communications device sends the MAC PDU through a direct link. Correspondingly, a receive end receives the MAC PDU through the direct link.

Herein, the receive end may be at least one second communications device or at least one third communications device in the following. However, this is not limited in this embodiment of this application. For example, the first communications device may send the MAC PDU in a broadcast or multicast manner. In this case, the receive end is all communications devices that can receive the MAC PDU.

S240: The receive end decapsulates the MAC PDU.

It should be understood that the receive end decapsulates the MAC PDU based on a format of the MAC PDU, for example, based on any format in FIG. 4 to FIG. 18 described below.

Therefore, according to the method in this embodiment of this application, data of different service types or different destination addresses is encapsulated into one MAC PDU, so that latency overheads caused by separately encapsulating data of a single service type or a single destination address and latency overheads caused by selecting resources for the data of the different service types or destination addresses can be avoided, thereby improving transmission efficiency.

In S210, the first data and the second data are two types of data, and the service type or the destination address of the first data is different from the service type or the destination address of the second data. For example, the first data and the second data may belong to different flows, different bearers, or different groups, or transmission requirements of the first data and the second data are different. It should be understood that service types or destination addresses of two types of data that belong to different flows, different bearers, or different groups, or have different transmission requirements are also different.

It should be understood that the first data on various first logical channel may be the same or may be different. This is not limited in this embodiment of this application. Similarly, the second data on various second logical channel may be the same or may be different. This is not limited in this embodiment of this application. A quantity of first logical channels and a quantity of second logical channels are not limited in this application either. Both the quantity of first logical channels and the quantity of second logical channels may be greater than or equal to 1, and the quantity of first logical channels and the quantity of second logical channels may be the same or may be different.

In S220, the first communications device may encapsulate the first data on each first logical channel and the second data on each second logical channel into one MAC PDU, to generate the MAC PDU.

Figure 3:
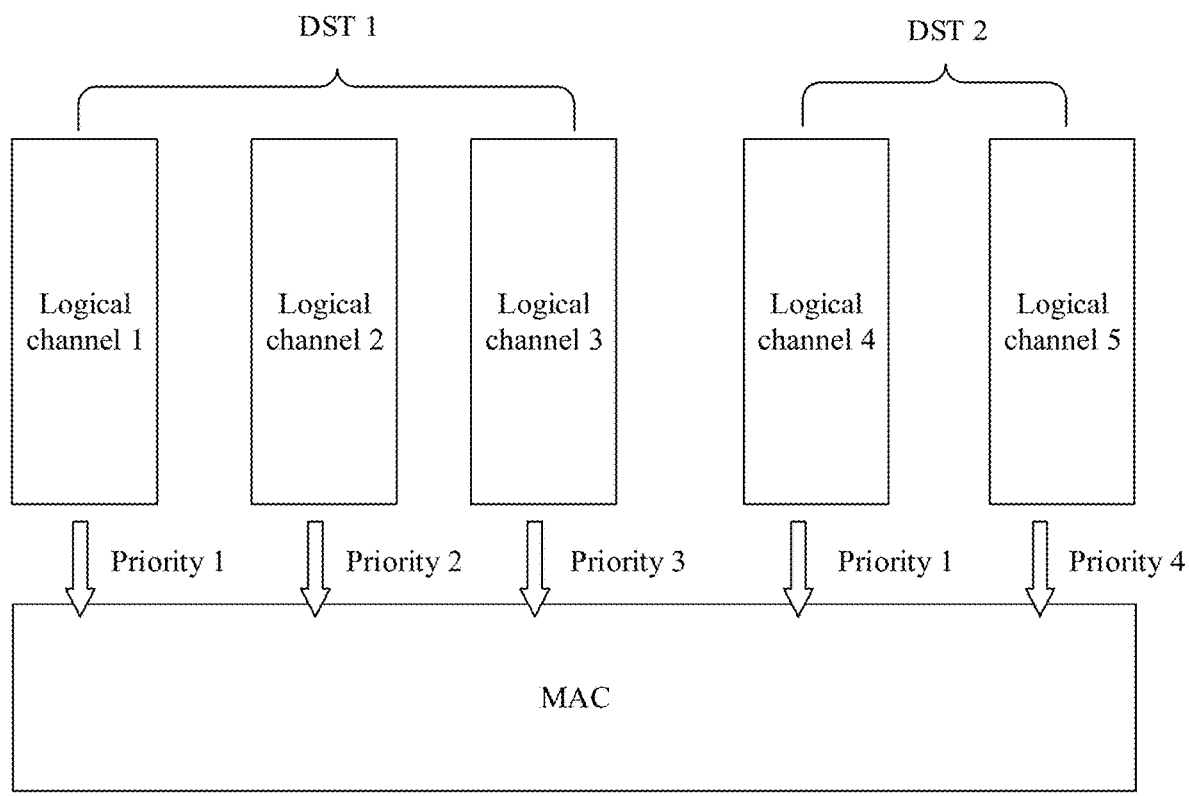
FIG. 3 is a schematic diagram of generating a MAC PDU according to an embodiment of this application.

For example, as shown in FIG. 3, a logical channel 1 to a logical channel 3 all belong to first logical channels, and both a logical channel 4 and a logical channel 5 belong to second logical channels. A destination address corresponding to the logical channel 1 to the logical channel 3 is different from a destination address corresponding to the logical channel 4 and the logical channel 5. The destination address corresponding to the logical channel 1 to the logical channel 3 is a DST 1, and the destination address corresponding to the logical channel 4 and the logical channel 5 is a DST 2. After obtaining data on each of the logical channel 1 to the logical channel 3 and data on each of the logical channel 4 and the logical channel 5, a MAC layer or the MAC entity of the first communications device may encapsulate the data into one MAC PDU.

It should be understood that data on a same logical channel has a same priority, and data of different priorities is mapped to different logical channels. Therefore, a priority of data may also be referred to as a priority of a logical channel. For example, referring to FIG. 3, priorities of the logical channel 1 to the logical channel 3 are respectively 1, 2, and 3, a priority of the logical channel 4 is 1, a priority of the logical channel 5 is 4, and a logical channel having a priority of 1 has a highest priority.

A format of the MAC PDU is described in detail below.

Optionally, in an embodiment of this application, the MAC PDU may include a first identifier and a second identifier. The first identifier is used to indicate a service type or a destination address of first data, and the second identifier is used to indicate a service type or a destination address of second data.

Specifically, the first identifier may explicitly or implicitly indicate the service type or the destination address of the first data. For example, the first identifier may be a first service type identifier associated with the first data, so that the first identifier may explicitly indicate the service type of the first data. For another example, the first identifier may be a first destination address identifier associated with the first data, so that the first identifier explicitly indicates the destination address of the first data. For still another example, the first identifier may be a first flow identifier, a first bearer identifier, a first group identifier, or a first transmission requirement identifier associated with the first data, so that the first identifier may implicitly indicate the service type or the destination address of the first data. Similarly, the second identifier may explicitly or implicitly indicate the service type or the destination address of the second data. For example, the second identifier may be a second service type identifier associated with the second data, so that the second identifier may explicitly indicate the service type of the second data. For another example, the second identifier may be a second destination address identifier associated with the second data, so that the second identifier explicitly indicates the destination address of the second data. For still another example, the second identifier may be a second flow identifier, a second bearer identifier, a second group identifier, or a second transmission requirement identifier associated with the second data, so that the second identifier may implicitly indicate the service type or the destination address of the second data. It should be understood that the first identifier may be a plurality of identifiers in the foregoing identifiers associated with the first data. In other words, the first identifier includes the plurality of identifiers in the foregoing identifiers associated with the first data. The second identifier is similar, and details are not described herein again.

In addition, the foregoing transmission requirement may be a latency, reliability, or the like, and a transmission requirement identifier may be a latency identifier, a reliability identifier, or the like. A specific parameter used to represent the transmission requirement is not limited in this embodiment of this application.

Optionally, in another embodiment of this application, the MAC PDU includes a first unit and a second unit. All content of the first unit is located before or behind the second unit. The first unit includes a first identifier and first data that is on each first logical channel, and the second unit includes a second identifier and second data that is on each second logical channel.

Figure 4:
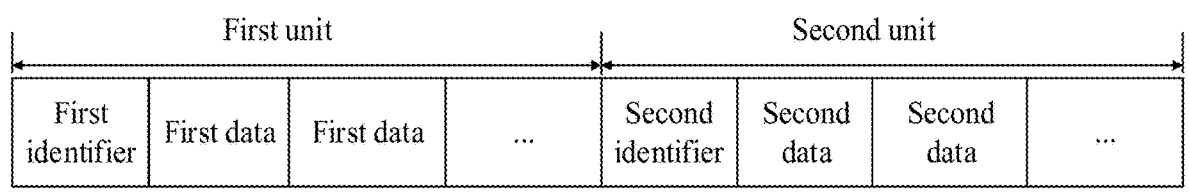

For example, referring to FIG. 4, each of the first unit and the second unit is a whole, and there is no overlapping part between the first unit and the second unit. That the first unit is located before the second unit may be understood as that after receiving the MAC PUD, a receive end first reads the first unit and then reads the second unit.

It should be understood that, in addition to the first identifier and the first data that is on each first logical channel, the first unit may further include another part. For example, the first unit may further include a MAC subheader, a source address, and the like that correspond to each piece of first data. This is not limited in this embodiment of this application. Similarly, in addition to the second identifier and the second data that is on each second logical channel, the second unit may further include another part. For example, the second unit may further include a MAC subheader, a source address, and the like that correspond to each piece of second data. This is not limited in this embodiment of this application.

According to the data transmission method in this embodiment of this application, the first data and the second data are separately encapsulated as a whole, so that the receive end can decapsulate the MAC PDU after receiving the first unit or the second unit, without a need to wait until all data in the MAC PDU is received. Therefore, decapsulation efficiency of the receive end can be improved.

In a possible embodiment, the MAC PDU may further include a MAC CE. In addition, if the first unit is located before the second unit, when the MAC CE is included in the first unit, the MAC CE is valid for at least one second communications device corresponding to the first identifier; or when the MAC CE is included in the second unit, the MAC CE is valid for at least one third communications device corresponding to the second identifier; or when the MAC CE is not included in the first unit and the second unit, the MAC control element is valid for both at least one second communications device and at least one third communications device; or when the MAC CE is not included in the first unit and the second unit, the MAC control element is valid for all communications devices that receive the MAC PDU.

In other words, the MAC CE in the first unit is valid for one or more communications devices (namely, the second communications device) corresponding to the first identifier. Alternatively, the MAC CE in the second unit is valid for one or more communications devices (namely, the third communications device) corresponding to the second identifier. Alternatively, the MAC CE that is not included in the first unit and the second unit is valid for one or more communications devices corresponding to the first identifier and one or more communications devices corresponding to the second identifier, or is valid for all the communications devices that receive the MAC PDU.

It should be understood that a quantity of MAC CEs in the MAC PDU is not limited in this embodiment of this application. A first MAC PDU may include only one MAC CE, or may include a plurality of MAC CEs. In addition, when the first unit includes the MAC CE, or in other words, the MAC control element is included in the first unit, the MAC CE may be at any location in the first unit. When the second unit includes the MAC CE, or in other words, the MAC control element is included in the second unit, the MAC CE may be at any location in the second unit. A location of the MAC CE in the first unit or the second unit is not limited in this embodiment of this application. In addition, when the MAC CE is not included in the first unit and the second unit, the MAC CE may be at any location, in the MAC PDU, other than the first unit and the second unit.

Optionally, in another embodiment of this application, the MAC PDU includes at least one first MAC subheader and at least one second MAC subheader. The at least one first MAC subheader is in a one-to-one correspondence with at least one piece of first data on the at least one first logical channel, and the at least one second MAC subheader is in a one-to-one correspondence with at least one piece of second data on the at least one second logical channel. In other words, one first MAC subheader corresponds to one piece of first data, and one second MAC subheader corresponds to one piece of second data. In addition, the at least one first MAC subheader, the at least one piece of first data, the at least one second MAC subheader, and the at least one piece of second data may be encapsulated in any one of the following two encapsulation manners, or in combination with the following two encapsulation manners, to generate the MAC PDU.

Encapsulation Manner 1

The first data and a MAC subheader corresponding to the first data are adjacently encapsulated into the MAC PDU, and/or the second data and a MAC subheader corresponding to the second data are adjacently encapsulated into the MAC PDU.

Figure 5:
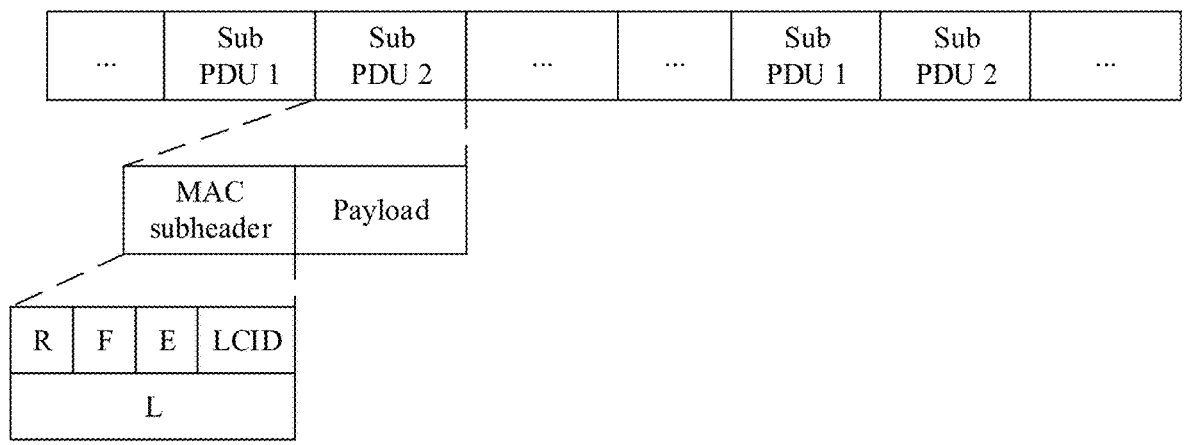

For example, referring to FIG. 5, each sub PDU includes a MAC subheader and a payload. Payloads in a front sub PDU 1 and sub PDU 2 are first data, and payloads in a rear sub PDU 1 and sub PDU 2 are second data. With reference to FIG. 3, a payload in the front sub PDU 1 in FIG. 5 may be data on the logical channel 1 shown in FIG. 3, and a MAC subheader in the sub PDU 1 may be a MAC subheader corresponding to the data on the logical channel 1 shown in FIG. 3. A payload in the front sub PDU 2 in FIG. 5 may be data on the logical channel 2 shown in FIG. 3, and a MAC subheader in the sub PDU 2 may be a MAC subheader corresponding to the data on the logical channel 2 shown in FIG. 3. A sub PDU corresponding to the logical channel 3 is not shown in FIG. 5. A payload in the rear sub PDU 1 in FIG.

5 may be data on the logical channel 4 shown in FIG. 3, and a MAC subheader in the sub PDU 1 may be a MAC subheader corresponding to the data on the logical channel 4 shown in FIG. 3. A payload in the rear sub PDU 2 in FIG. 5 may be data on the logical channel 5 shown in FIG. 3, and a MAC subheader in the sub PDU 2 may be a MAC subheader corresponding to the data on the logical channel 5 shown in FIG. 3.

It should be understood that, the payload in the front sub PDU 2 shown in FIG. 5 may alternatively be second data. In other words, the first data and the second data may be alternately encapsulated, or the second data may be encapsulated after all first data is encapsulated. This is not limited in this embodiment of this application.

It should be further understood that if the first data and the MAC subheader corresponding to the first data are adjacently encapsulated into the MAC PDU, when the second data is encapsulated, the second data may not be encapsulated in an encapsulation format in which the second data and the MAC subheader corresponding to the second data are adjacently encapsulated into the MAC PDU. For example, the second data may be encapsulated in an encapsulation manner in which the at least one piece of second data is adjacently encapsulated into the MAC PDU. This is not limited in this embodiment of this application. Alternatively, if the second data and the MAC subheader corresponding to the second data are adjacently encapsulated into the MAC PDU, when the first data is encapsulated, the first data may not be encapsulated in an encapsulation format in which the first data and the MAC subheader corresponding to the first data are adjacently encapsulated into the MAC PDU. For example, the first data may be encapsulated in an encapsulation manner in which the at least one piece of first data is adjacently encapsulated into the MAC PDU. This is not limited in this embodiment of this application.

In this application, optionally, the first MAC subheader may include a ninth identifier. The ninth identifier is used to indicate whether a first MAC subheader or first data is further encapsulated behind the first MAC subheader or the first data; and/or the second MAC subheader includes a tenth identifier, and the tenth identifier is used to indicate whether a second MAC subheader or second data is further encapsulated behind the second MAC subheader or the second data.

For example, referring to FIG. 5, information in a field E is a ninth identifier or a tenth identifier. The information in the field E is used to indicate whether a MAC subheader or data is further encapsulated behind the MAC subheader. Specifically, if the payloads in the front sub PDU 1 and sub PDU 2 in FIG. 5 are the first data, and the payloads in the rear sub PDU 1 and sub PDU 2 are the second data, information in a field E of the MAC subheader in the front sub PDU 1 is used to indicate whether a first MAC subheader or first data is further encapsulated behind the MAC subheader in the sub PDU 1, and information in a field E of the MAC subheader in the rear sub PDU 1 is used to indicate whether a second MAC subheader or second data is further encapsulated behind the MAC subheader in the sub PDU 1.

For example, referring to FIG. 5, the first MAC subheader and/or the second MAC subheader may further include a corresponding logical channel identifier field LCID and a length indication field L of data corresponding to the MAC subheader. Further, the MAC subheader may further include a reserved field R. The field LCID is used to indicate a logical channel from which the data corresponding to the MAC subheader comes. For example, information in the field LCID may be an identifier of a logical channel. The field L is used to indicate a length of data, corresponding to a MAC subheader, in a unit of byte.

It should be understood that a format of the first MAC subheader and a format of the second MAC subheader may be the same or may be different. This is not limited in this embodiment of this application.

Encapsulation Manner 2

The at least one first MAC subheader is adjacently encapsulated into the MAC PDU and the at least one piece of first data is adjacently encapsulated into the MAC PDU; and/or the at least one second MAC subheader is adjacently encapsulated into the MAC PDU and the at least one piece of second data is adjacently encapsulated into the MAC PDU.

In other words, all first MAC subheaders may be adjacently encapsulated into the MAC PDU, and all first data may be adjacently encapsulated into the MAC PDU; and/or all second MAC subheaders may be adjacently encapsulated into the MAC PDU, and all second data may be adjacently encapsulated into the MAC PDU.

For example, referring to FIG. 6, all first MAC subheaders are adjacently encapsulated into a MAC PDU, all first data is adjacently encapsulated into the MAC PDU, and the last first MAC subheader and the first first data are adjacently encapsulated. All second MAC subheaders are adjacently encapsulated into the MAC PDU, all second data is adjacently encapsulated into the MAC PDU, and the last second MAC subheader and the first second data are adjacently encapsulated.

It should be understood that FIG. 6 shows that the last first MAC subheader and the first first data are adjacently encapsulated. However, in an actual operation, the last first MAC subheader and the first first data may not be adjacently encapsulated. For example, other information may be encapsulated behind the last first MAC subheader, and then the first first data is encapsulated. The second data and the second MAC subheader are also similar.

For still another example, referring to FIG. 7, all first MAC subheaders are adjacently encapsulated into a MAC PDU, all second MAC subheaders are adjacently encapsulated into the MAC PDU, and the last first MAC subheader and the first second MAC subheader are adjacently encapsulated. All first data is adjacently encapsulated into the MAC PDU, all second data is adjacently encapsulated into the MAC PDU, and the last first data and the first second data are adjacently encapsulated.

It should be understood that FIG. 7 shows that the last first MAC subheader and the first second MAC subheader are adjacently encapsulated. However, in an actual operation, the last first MAC subheader and the first second MAC subheader may not be adjacently encapsulated. For example, other information may be encapsulated behind the last first MAC subheader, and then the first second MAC subheader is encapsulated. The first data and the second data are also similar.

It should be further understood that if all the first MAC subheaders are adjacently encapsulated into the MAC PDU, and all the first data is adjacently encapsulated into the MAC PDU, when the second data and the second MAC subheader are encapsulated, the second data and the second MAC subheader may not be encapsulated in the encapsulation format shown in FIG. 6 or FIG. 7. For example, the second data and the second MAC subheader may be encapsulated in the encapsulation format shown in FIG. 5. This is not limited in this embodiment of this application. Alternatively, if all the second MAC subheaders are adjacently encapsulated into the MAC PDU, and all the second data is adjacently encapsulated into the MAC PDU, when the first data and the first MAC subheader are encapsulated, the first data and the first MAC subheader may not be encapsulated in the encapsulation format shown in FIG. 6 or FIG. 7. For example, the first data and the first MAC subheader may be encapsulated in the encapsulation format shown in FIG. 5. This is not limited in this embodiment of this application. In other words, the encapsulation format 1 and the encapsulation format 2 may be used together.

It should be noted that in a process of encapsulating the MAC PDU, the first data may be first encapsulated or the second data may be first encapsulated. This is not limited in this embodiment of this application.

Optionally, an encapsulation order of data on different logical channels, or in other words, an encapsulation order of the at least one piece of first data and the at least one piece of second data, may be performed based on the following principles.

Principle 1

Encapsulation is performed based on a latency requirement, and data corresponding to a logical channel having a low latency is preferentially encapsulated.

Specifically, the first communications device may preferentially encapsulate, into the MAC PDU, data whose latency requirement is less than or equal to a first threshold in the at least one piece of first data on the at least one first logical channel and the at least one piece of second data on the at least one second logical channel. To be specific, the first threshold may be preset. During data encapsulation, the first communications device preferentially encapsulates the data whose latency requirement is less than or equal to the first threshold in the at least one first logical channel and the at least one second logical channel, and then encapsulates data whose latency requirement is greater than the first threshold.

The logical channels shown in FIG. 3 are used as an example. Assuming that latency requirements of data on the logical channel 1 and data on the logical channel 4 are less than or equal to the first threshold and latency requirements of data on the logical channel 2, data on the logical channel 3, and data on the logical channel 5 successively increase, the first communications device may first encapsulate the data on the logical channel 1 and data on the logical channel 4, and then successively encapsulate the data on the logical channel 2, the data on the logical channel 3, and the data on the logical channel 5.

Principle 2

The first communications device preferentially encapsulates, into the MAC PDU, data whose latency requirement is less than or equal to a second threshold in the at least one piece of first data on the at least one first logical channel.

To be specific, the first communications device may first encapsulate the data whose latency requirement is less than or equal to the second threshold on the at least one first logical channel, and then encapsulate data on another first logical channel and all second logical channels. An encapsulation order of data on first logical channels and all the second logical channels may be performed according to the prior art. For example, data having a high logical channel priority may be first encapsulated, and then data having a low logical channel priority is encapsulated. However, this is not limited in this embodiment of this application.

The logical channels shown in FIG. 3 are still used as an example. Assuming that a latency requirement of data on the logical channel 1 is less than or equal to the second threshold and latency requirements of data on the logical channel 2 and the logical channel 3 are greater than the second threshold, the first communications device may first encapsulate the data on the logical channel 1, and then encapsulate data on the logical channel 2 to the logical channel 5. For example, when the data on the logical channel 2 to the logical channel 5 is encapsulated, data on the logical channel 4 may be first encapsulated, and then data on the logical channel 2, data on the logical channel 3, and data on the logical channel 5 are successively encapsulated.

It should be understood that the first communications device may alternatively first preferentially encapsulate, into the MAC PDU, data whose latency requirement is less than or equal to a preset threshold in the at least one piece of second data on the at least one second logical channel.

Principle 3

The first communications device preferentially encapsulates the at least one piece of first data on the at least one first logical channel into the MAC PDU.

To be specific, the first communications device may first encapsulate the first data and then encapsulate the second data. The logical channels shown in FIG. 3 are used as an example. The first communications device may first encapsulate data on the logical channel 1 to the logical channel 3 and then encapsulate data on the logical channel 4 and the logical channel 5. When data on first logical channels is encapsulated, the first communications device may preferentially encapsulate data having a high logical channel priority, or may preferentially encapsulate data having a low latency requirement, or may perform encapsulation according to another rule. This is not limited in this embodiment of this application.

It should be understood that the first communications device may alternatively preferentially encapsulate the second data, and then encapsulate the first data.

Optionally, in an embodiment of this application, the MAC PDU may further include one or more of the following (1) to (3).

(1) Third Identifier and/or Fourth Identifier

The third identifier and/or the fourth identifier are/is used to indicate an identity or an address of the first communications device. In addition, both the third identifier corresponding to the first data and the fourth identifier corresponding to the second data are encapsulated into the MAC PDU. Alternatively, the third identifier or the fourth identifier is encapsulated into the MAC PDU. In other words, both the third identifier and the fourth identifier are encapsulated into the MAC PDU, or only one of the third identifier and the fourth identifier is encapsulated into the MAC PDU.

Specifically, the third identifier or the fourth identifier may be a device ID of the first communications device or the address of the first communications device. The third identifier and the fourth identifier may be the same or may be different. If both the third identifier and the fourth identifier are encapsulated into the MAC PDU, the at least one second communications device corresponding to the first data can identify the third identifier, and the at least one third communications device corresponding to the second data can identify the fourth identifier. If only the third identifier or the fourth identifier is encapsulated into the MAC PDU, the at least one second communications device and the at least one third communications device can identify the third identifier or the fourth identifier.

(2) Fifth Identifier and/or Sixth Identifier

The fifth identifier and/or the sixth identifier are/is used to indicate a format type of a corresponding address field in the MAC PDU.

Specifically, if the fifth identifier or the sixth identifier is encapsulated into the MAC PDU, the fifth identifier or the sixth identifier is used to indicate a format type of the MAC PDU, or indicate a format type of an adjacent address field behind the fifth identifier or the sixth identifier in the MAC PDU. That the fifth identifier or the sixth identifier is used to indicate a format type of the MAC PDU means that the fifth identifier or the sixth identifier is used to indicate a format of the MAC PDU, or in other words, a specific meaning respectively represented by each bit in the MAC PDU. That the fifth identifier or the sixth identifier is used to indicate a format type of an adjacent address field behind the fifth identifier or the sixth identifier in the MAC PDU means that the fifth identifier or the sixth identifier is used to indicate a specific meaning respectively represented by each bit in the adjacent address field behind the fifth identifier or the sixth identifier. For example, if the adjacent address field behind the fifth identifier or the sixth identifier is a MAC subheader, the fifth identifier or the sixth identifier represents a meaning represented by each bit in the MAC subheader.

Alternatively, if both the fifth identifier and the sixth identifier are encapsulated into the MAC PDU, the fifth identifier is used to indicate a format type of an address field corresponding to the first data, and the sixth identifier is used to indicate a format type of an address field corresponding to the second data. To be specific, the fifth identifier is used to indicate a specific meaning respectively represented by each address field corresponding to the first unit including the first data, and the sixth identifier is used to indicate a specific meaning respectively represented by each address field corresponding to the second unit including the second data.

Optionally, the format type of the address field corresponding to the first data may be a format type of an address field, in the MAC PDU, corresponding to the first identifier corresponding to the first data. Optionally, the format type of the address field corresponding to the second data may be a format type of an address field, in the MAC PDU, corresponding to the second identifier corresponding to the second data.

It should be understood that the fifth identifier and the sixth identifier may be the same or may be different. This is not limited in this embodiment of this application.

Further, the format type is any one of the following:

a unicast format type, a multicast format type, a broadcast format type, a vehicle platooning service format type, a control information format type, a data format type, a MAC CE, and a fixed protocol version format type.

Optionally, the MAC CE may be a common MAC CE or a dedicated MAC CE. The common MAC CE is valid for all receive ends that receive the MAC PDU, or the common MAC CE is valid for receive ends that receive the MAC PDU and that correspond to the first identifier and the second identifier. The dedicated MAC CE is valid only for a receive end corresponding to the first identifier or the second identifier associated with the dedicated MAC CE.

(3) Seventh Identifier and/or Eighth Identifier

The seventh identifier is used to indicate a quantity of first logical channels that is included in the MAC PDU or a quantity of pieces of first data that is included in the MAC PDU, and the eighth identifier is used to indicate a quantity of second logical channels that is included in the MAC PDU or a quantity of pieces of second data that is included in the MAC PDU.

The following describes several possible formats of the MAC PDU by using examples with reference to the foregoing descriptions.

Figure 8:
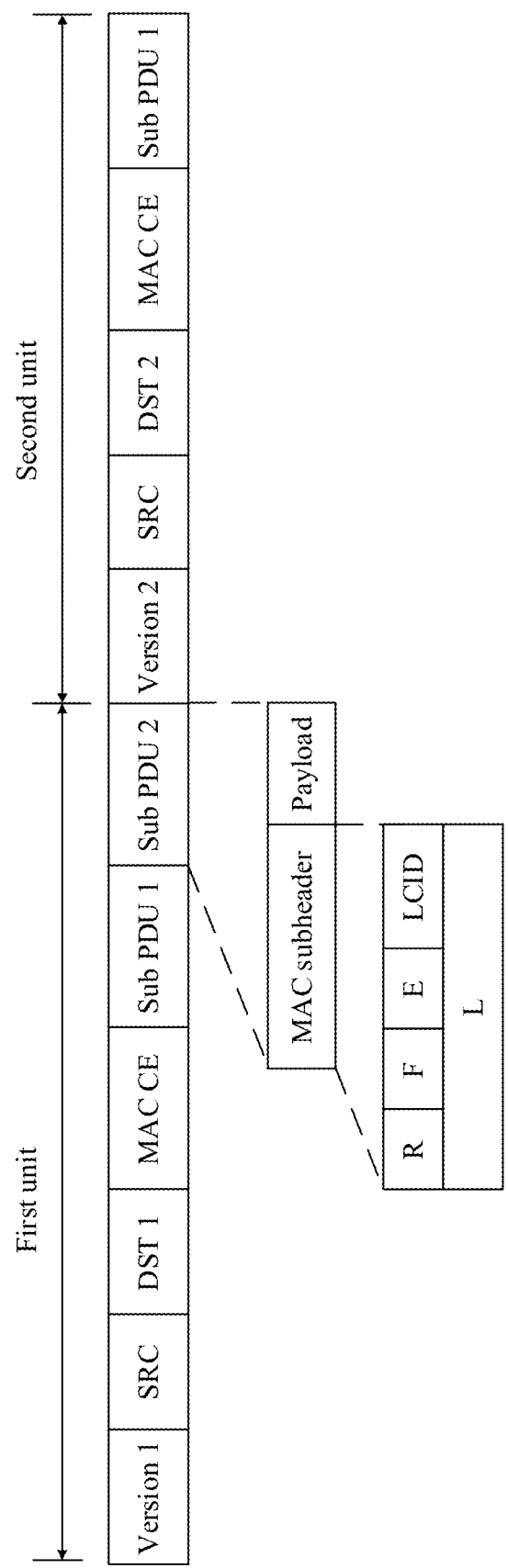

FIG. 8 is a schematic diagram of a format of a MAC PDU. Referring to FIG. 8, a DST 1 and a DST 2 may be the foregoing first identifier and second identifier, an SRC may be the foregoing third identifier or fourth identifier, and a version 1 and a version 2 may be the foregoing fifth identifier and sixth identifier. There are two logical channels (namely, first logical channels) corresponding to the DST 1, and data on the two logical channels is encapsulated into a sub PDU 1 and a sub PDU 2 in a first unit respectively. There is one logical channel (namely, second logical channel) corresponding to the DST 2, and data on the logical channel is encapsulated into a sub PDU 1 in a second unit. For a format of a sub PDU, refer to the foregoing description of FIG. 5. Details are not described herein again. A MAC CE in the first unit is as described above, and the MAC CE in the first unit is valid for a communications device corresponding to the DST 1, or is valid for all communications devices in a group including a communications device corresponding to the DST 1. A MAC CE in the second unit is valid for a communications device corresponding to the DST 2, or is valid for all communications devices in a group including a communications device corresponding to the DST 2.

Figure 9:
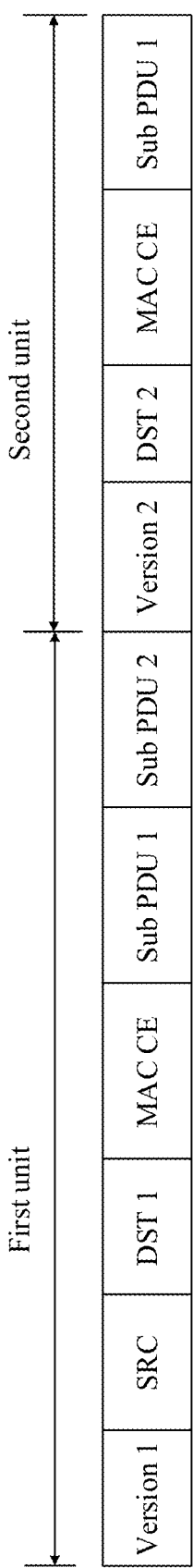

FIG. 9 is a schematic diagram of a format of a MAC PDU. For a meaning of each field in FIG. 9, refer to the foregoing description of FIG. 8. Different from FIG. 8, a second unit in FIG. 9 does not include an SRC, in other words, the MAC PDU includes only one SRC. In this case, both communications devices corresponding to a DST 1 and a DST 2 can identify a communications device corresponding to the SRC, namely, a first communications device.

It should be understood that a relative location of a MAC CE in each unit is not limited in this embodiment of this application. For example, a MAC CE in a first unit may be located behind a sub PDU 2 or before the SRC.

Figure 10:
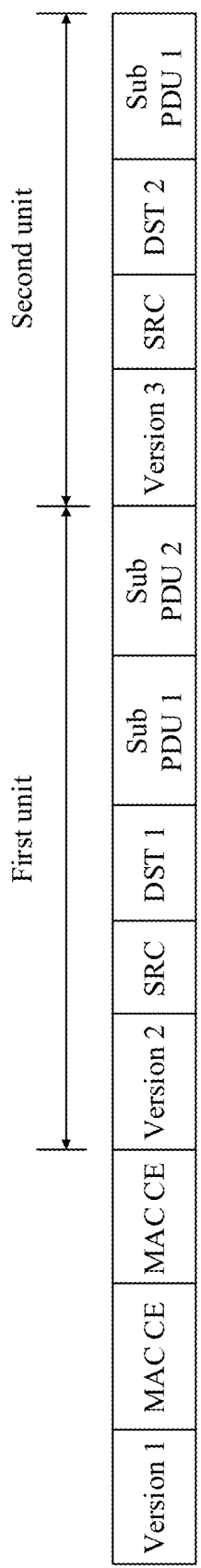

FIG. 10 is a schematic diagram of a format of a MAC PDU. Referring to FIG. 10, a DST 1 and a DST 2 may be the foregoing first identifier and second identifier, an SRC may be the foregoing third identifier or fourth identifier, and a version 2 and a version 3 may be the foregoing fifth identifier and the sixth identifier. There are two logical channels (namely, first logical channels) corresponding to the DST 1, and data on the two logical channels is encapsulated into a sub PDU 1 and a sub PDU 2 in a first unit respectively. There is one logical channel (namely, second logical channel) corresponding to the DST 2, and data on the logical channel is encapsulated into a sub PDU 1 in a second unit. For a format of a sub PDU, refer to the foregoing description of FIG. 5. Details are not described herein again. Different from the formats of the MAC PDU shown in FIG. 8 and FIG. 9, the MAC PDU may include a common MAC CE, and the common MAC CE is valid for all receive ends that receive the MAC PDU. The common MAC CE may be placed before, behind, or in the middle of all units (for example, the first unit and the second unit). For example, in FIG. 10, two common MAC CEs are respectively placed before the first unit and the second unit. Before the common MAC CE, a version number (namely, a version 1 in FIG. 10) having a dedicated value may be added to indicate that the MAC CE is the common MAC CE.

FIG. 11 is a schematic diagram of a format of a MAC PDU. Referring to FIG. 11, a DST 1 and a DST 2 may be the foregoing first identifier and second identifier, an SRC may be the foregoing third identifier or fourth identifier, and a version 1 may be the foregoing fifth identifier or sixth identifier. There are two logical channels (namely, first logical channels) corresponding to the DST 1, and data on the two logical channels is encapsulated into a sub PDU 1 and a sub PDU 2 in a first unit respectively. There is one logical channel (namely, second logical channel) corresponding to the DST 2, and data on the logical channel is encapsulated into a sub PDU 1 in a second unit. For a format of a sub PDU, refer to the foregoing description of FIG. 5. Details are not described herein again. Different from the formats of the MAC PDU shown in FIG. 8 to FIG. 10, the MAC PDU has only one version number (namely, the version 1) used to indicate a version of the MAC PDU or indicate that the MAC PDU carries a common MAC CE.

FIG. 12 and FIG. 13 each are schematic diagrams of a format of a MAC PDU. Referring to FIG. 12 and FIG. 13, the MAC PDU may include a MAC header and a MAC payload, or may further include another part. This is not limited in this embodiment of this application. The MAC header includes a plurality of function subheaders (for example, referred to as SL-SCH subheaders), and each SL-SCH subheader includes an indication field (namely, the seventh identifier or the eighth identifier in the foregoing) for a quantity of logical channels, to indicate a quantity, included in the MAC PDU, of logical channels corresponding to a DST. For example, if the MAC PDU includes quantities of logical channels corresponding to a DST 1 and a DST 2, the MAC PDU includes two SL-SCH subheaders. The first SL-SCH subheader includes an indication field for a quantity of logical channels, to indicate a quantity of logical channels corresponding to the DST 1. The second SL-SCH subheader includes an indication field for a quantity of logical channels, to indicate a quantity of logical channels corresponding to the DST 2. A MAC subheader is in a one-to-one correspondence with a MAC SDU, and information in the MAC SDU is first data or second data. The quantity of logical channels indicated by the indication field for a quantity of logical channels in the first SL-SCH subheader is equal to a quantity of first MAC subheaders in MAC subheaders or is equal to a quantity of MAC SDUs corresponding to first MAC subheaders. The quantity of logical channels indicated by the indication field for a quantity of logical channels in the second SL-SCH subheader is equal to a quantity of second MAC subheaders in the MAC subheaders or is equal to a quantity of MAC SDUs corresponding to second MAC subheaders.

Optionally, a MAC payload part may further include a padding (padding) field, used for subsequent extension of the MAC PDU.

Different from FIG. 13, in FIG. 12, a plurality of SL-SCH subheaders are adjacently encapsulated, and a plurality of MAC subheaders are adjacently encapsulated. In FIG. 13, an SL-SCH subheader is first encapsulated, and then a plurality of MAC subheaders corresponding to the SL-SCH subheader are encapsulated. Then, another SL-SCH subheader is encapsulated, and then a plurality of MAC subheaders corresponding to the another SL-SCH subheader are encapsulated.

Figure 14:
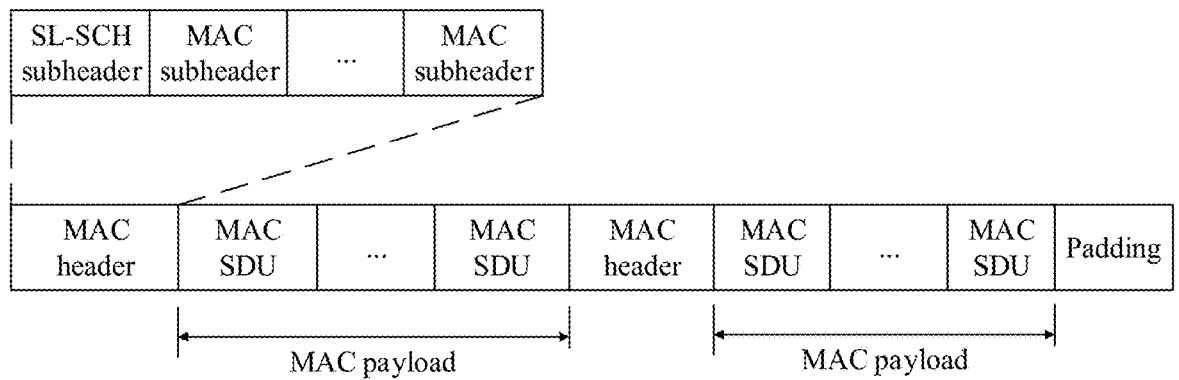

FIG. 14 is a schematic diagram of a format of a MAC PDU. Referring to FIG. 14, different from FIG. 12 and FIG. 13, the MAC PDU may include two MAC headers and two MAC payloads, or may further include another part. This is not limited in this embodiment of this application. Each MAC header includes one SL-SCH subheader, and each SL-SCH subheader includes an indication field (namely, the seventh identifier or the eighth identifier in the foregoing) for a quantity of logical channels, to indicate a quantity, included in the MAC PDU, of logical channels corresponding to a DST. The first SL-SCH subheader includes an indication field for a quantity of logical channels, to indicate a quantity of logical channels corresponding to a DST 1. The second SL-SCH subheader includes an indication field for a quantity of logical channels, to indicate a quantity of logical channels corresponding to a DST 2. A MAC subheader is in a one-to-one correspondence with a MAC SDU. Information in a MAC SDU corresponding to a MAC subheader corresponding to the first SL-SCH subheader is first data, and information in a MAC SDU corresponding to a MAC subheader corresponding to the second SL-SCH subheader is second data. The quantity of logical channels indicated by the indication field for a quantity of logical channels in the first SL-SCH subheader is equal to a total quantity of MAC subheaders behind the first SL-SCH subheader or is equal to a total quantity of corresponding MAC SDUs. The quantity of logical channels indicated by the indication field for a quantity of logical channels in the second SL-SCH subheader is equal to a total quantity of MAC subheaders behind the second SL-SCH subheader or is equal to a total quantity of corresponding MAC SDUs.

Optionally, a MAC payload part may further include a padding (padding) field, used for subsequent extension of the MAC PDU.

Figure 15:
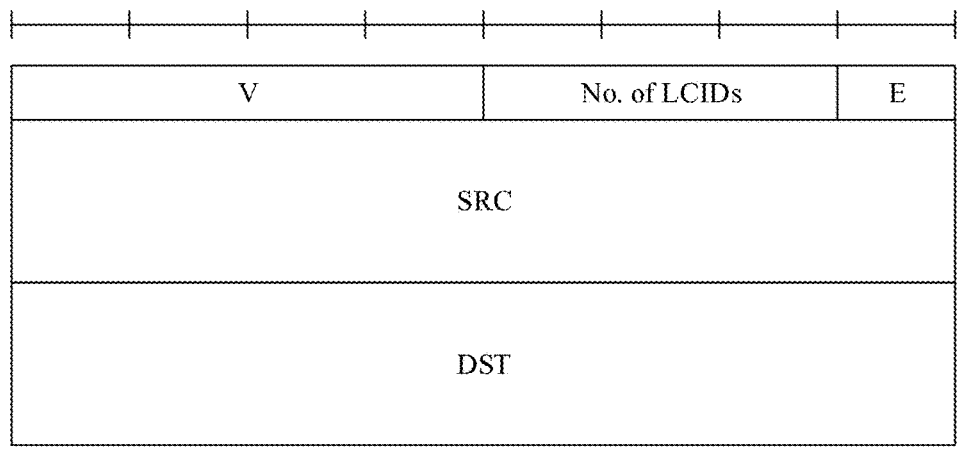
FIG. 15 is a schematic diagram of a format of an SL-SCH subheader according to an embodiment of this application.
Figure 16:
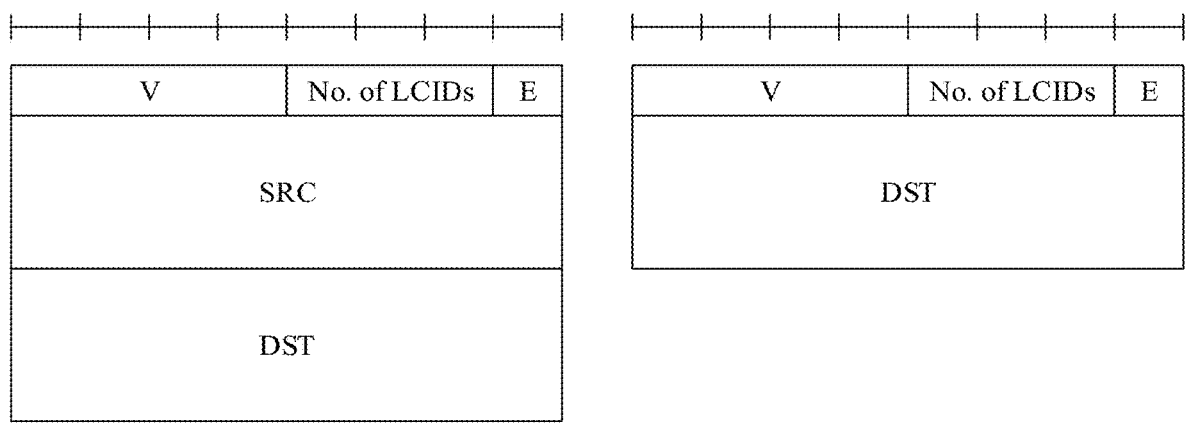
FIG. 16 is a schematic diagram of a format of another SL-SCH subheader according to an embodiment of this application.

Optionally, a format of the SL-SCH subheader may be any format shown in FIG. 15 or FIG. 16. However, this is not limited in this embodiment of this application.

Referring to FIG. 15 and FIG. 16, V is a fifth identifier or a sixth identifier, and indicates a format type of an address field in a MAC PDU corresponding to the SL-SCH subheader, to be specific, a specific meaning respectively represented by each bit of the SL-SCH subheader.

No. of LCIDs is a seventh identifier or an eighth identifier, and indicates a quantity of logical channels that is included in the address field of the MAC PDU corresponding to the SL-SCH subheader or a quantity of MAC SDUs that is included in the address field of the MAC PDU corresponding to the SL-SCH subheader.

E indicates whether another MAC subheader or other data is further encapsulated behind the address field of the MAC PDU corresponding to the SL-SCH subheader.

For an SRC and a DST in FIG. 15, refer to the foregoing descriptions. Details are not described herein again. Referring to FIG. 15, DSTs in SL-SCH subheaders corresponding to different DSTs are different. For example, for the first SL-SCH subheader in FIG. 12 to FIG. 14, the DST in FIG. 15 may be a DST 1, and for the second SL-SCH subheader in FIG. 12 to FIG. 14, the DST in FIG. 15 may be a DST 2. Referring to FIG. 16, a figure on the left of FIG. 16 shows a format of the first SL-SCH subheader, and a figure on the right of FIG. 16 shows a format of an SL-SCH subheader other than the first SL-SCH subheader.

It should be noted that in the formats of the SL-SCH subheader shown in FIG. 15 and FIG. 16, V occupies four bits, No. of LCIDs occupies three bits, and E occupies one bit. The SRC occupies three bytes, and the DST occupies three bytes. However, a quantity of bits occupied by each field is not limited in this embodiment of this application. The formats of the SL-SCH subheader shown in FIG. 15 and FIG. 16 are merely examples for description, and should not constitute any limitation on this embodiment of this application.

Figure 17:
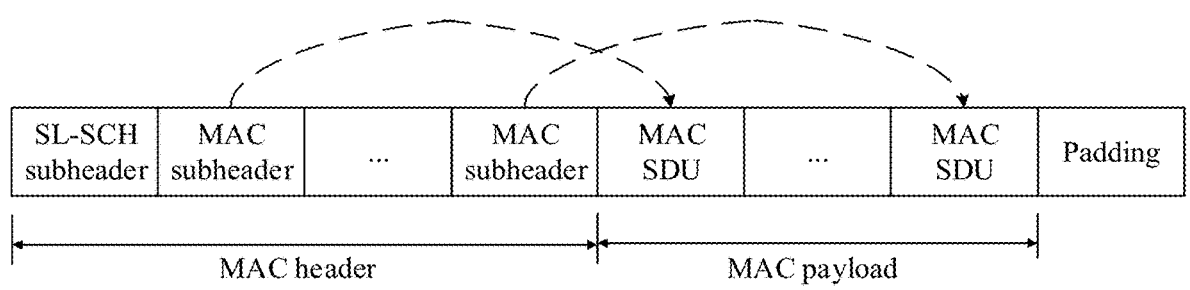
FIG. 17 is a schematic diagram of a format of a MAC PDU according to an embodiment of this application.

FIG. 17 is a schematic diagram of a format of a MAC PDU. Referring to FIG. 17, different from the formats of the MAC PDU shown in FIG. 12 to FIG. 15, the MAC PDU may include only one SL-SCH subheader, or may further include another part. This is not limited in this embodiment of this application. For the format of the MAC PDU shown in FIG. 17, refer to the foregoing descriptions of related parts in FIG. 12 to FIG. 15. For brevity, details are not described herein again.

Optionally, a MAC payload part may further include a padding field, used for subsequent extension of the MAC PDU.

Figure 18:
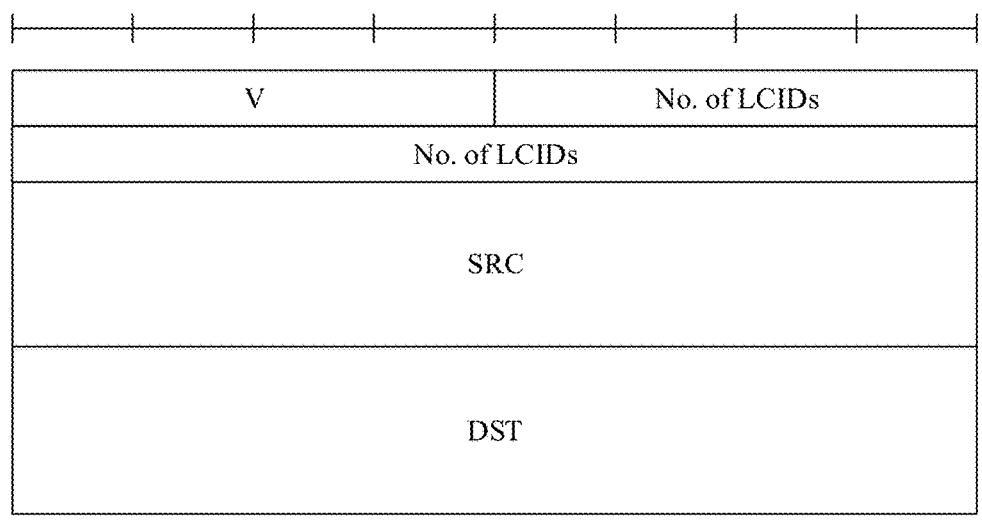
FIG. 18 is a schematic diagram of a format of still another SL-SCH subheader according to an embodiment of this application.

Optionally, a format of the SL-SCH subheader may be a format shown in FIG. 18. However, this is not limited in this embodiment of this application.

Referring to FIG. 18, V is a fifth identifier or a sixth identifier, and indicates a format type of an address field in a MAC PDU corresponding to the SL-SCH subheader, to be specific, a specific meaning respectively represented by each bit of the SL-SCH subheader.

No. of LCIDs is a seventh identifier or an eighth identifier, and indicates a quantity of logical channels that is included in the address field of the MAC PDU corresponding to the SL-SCH subheader or a quantity of MAC SDUs that is included in the address field of the MAC PDU corresponding to the SL-SCH subheader.

E indicates whether another MAC subheader or other data is further encapsulated behind the address field of the MAC PDU corresponding to the SL-SCH subheader.

A DST in FIG. 18 is a group identifier and is used to identify an SRC or a group in which a first communications device is located, and a DST 2 and a DST 3 are destination addresses of member communications devices in a group in which a communications device corresponding to a DST 1 is located. In other words, destination addresses of the MAC PDU are the DST 2 and the DST 3.

It should be noted that, in the format of the SL-SCH subheader shown in FIG. 18, V occupies four bits, No. of LCIDs occupies 12 bits, the SRC occupies three bytes, and the DST occupies three bytes. However, a quantity of bits occupied by each field is not limited in this embodiment of this application. The format of the SL-SCH subheader shown in FIG. 18 is merely an example for description, and should not constitute any limitation on this embodiment of this application.

It should be understood that examples in FIG. 4 to FIG. 18 are provided merely for helping a person skilled in the art understand the embodiments of this application, instead of limiting the embodiments of this application to formats shown in the examples. A person skilled in the art can clearly make various equivalent modifications or changes according to the examples in FIG. 4 to FIG. 18, and such modifications or changes also fall within the scope of the embodiments of this application.

Figure 19:
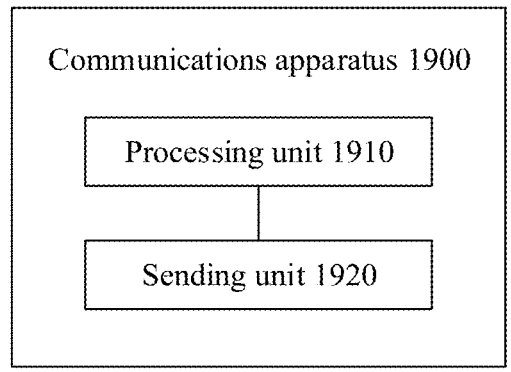
FIG. 19 is a schematic structural diagram of a communications apparatus according to an embodiment of this application.

FIG. 19 is a schematic structural diagram of a communications apparatus according to an embodiment of this application. A communications apparatus 1900 may include a processing unit 1910 and a sending unit 1920. It should be understood that the communications apparatus 1900 shown in FIG. 19 is merely an example. The communications apparatus in this embodiment of this application may further include another module or unit, or include a unit with a function similar to that of each module in FIG. 19, or may not necessarily include all units in FIG. 19.

The processing unit 1910 is used by a media access control MAC entity to obtain, from an upper layer, first data on each of at least one first logical channel and second data on each of at least one second logical channel, where a service type or a destination address of the first data is different from a service type or a destination address of the second data.

The processing unit 1910 is further configured to generate a MAC protocol data unit PDU, where the MAC PDU includes the first data on each first logical channel and the second data on each second logical channel.

The sending unit 1920 is configured to send the MAC PDU through a direct link.

Optionally, the MAC PDU includes a first identifier and a second identifier, the first identifier is used to indicate the service type or the destination address of the first data, and the second identifier is used to indicate the service type or the destination address of the second data.

Optionally, the first identifier is any one or more of the following associated with the first data:
a first service type identifier, a first flow identifier, a first bearer identifier, a first group identifier, a first destination address identifier, and a first transmission requirement identifier; and
the second identifier is any one or more of the following associated with the second data:
a second service type identifier, a second flow identifier, a second bearer identifier, a second group identifier, a second destination address identifier, and a second transmission requirement identifier.

Optionally, the MAC PDU includes a first unit and a second unit, all content of the first unit is located before or behind the second unit, the first unit includes the first identifier and the first data that is on each first logical channel, and the second unit includes the second identifier and the second data that is on each second logical channel.

Optionally, the first unit is located before the second unit, and the MAC PDU further includes a MAC control element; and when the MAC control element is included in the first unit, the MAC control element is valid for at least one second communications device corresponding to the first identifier; or when the MAC control element is included in the second unit, the MAC control element is valid for at least one third communications device corresponding to the second identifier; or when the MAC control element is not included in the first unit and the second unit, the MAC control element is valid for both at least one second communications device and at least one third communications device; or when the MAC control element is not included in the first unit and the second unit, the MAC control element is valid for all communications devices that receive the MAC PDU.

Optionally, the MAC PDU includes at least one first MAC subheader and at least one second MAC subheader, the at least one first MAC subheader is in a one-to-one correspondence with at least one piece of first data on the at least one first logical channel, and the at least one second MAC subheader is in a one-to-one correspondence with at least one piece of second data on the at least one second logical channel.

The processing unit 1910 is specifically configured to:
generate the MAC PDU by adjacently encapsulating the first data and a MAC subheader corresponding to the first data into the MAC PDU, and/or by adjacently encapsulating the second data and a MAC subheader corresponding to the second data into the MAC PDU; or generate the MAC PDU by adjacently encapsulating the at least one first MAC subheader into the MAC PDU and adjacently encapsulating the at least one piece of first data into the MAC PDU, and/or by adjacently encapsulating the at least one second MAC subheader into the MAC PDU and adjacently encapsulating the at least one piece of second data into the MAC PDU.

Optionally, the MAC PDU includes a third identifier and/or a fourth identifier, and the third identifier and/or the fourth identifier are/is used to indicate an identity or an address of the communications apparatus.

The processing unit 1910 is specifically configured to:

generate the MAC PDU by encapsulating both the third identifier corresponding to the first data and the fourth identifier corresponding to the second data into the MAC PDU; or generate the MAC PDU by encapsulating the third identifier or the fourth identifier into the MAC PDU.

Optionally, the MAC PDU includes a fifth identifier and/or a sixth identifier.

The processing unit 1910 is specifically configured to:

generate the MAC PDU by encapsulating the fifth identifier or the sixth identifier into the MAC PDU, where the fifth identifier or the sixth identifier is used to indicate a format type of the MAC PDU; or generate the MAC PDU by encapsulating the fifth identifier or the sixth identifier into the MAC PDU, where the fifth identifier or the sixth identifier is used to indicate a format type of an adjacent address field behind the fifth identifier or the sixth identifier in the MAC PDU; or generate the MAC PDU by encapsulating both the fifth identifier and the sixth identifier into the MAC PDU, where the fifth identifier is used to indicate a format type of an address field corresponding to the first data, and the sixth identifier is used to indicate a format type of an address field corresponding to the second data.

Optionally, the format type is any one of the following:

a unicast format type, a multicast format type, a broadcast format type, a vehicle platooning service format type, a control information format type, a data format type, a MAC control element, and a fixed protocol version format type.

Optionally, the MAC PDU includes a seventh identifier and/or an eighth identifier, the seventh identifier is used to indicate a quantity of first logical channels that is included in the MAC PDU or a quantity of pieces of first data that is included in the MAC PDU, and the eighth identifier is used to indicate a quantity of second logical channels that is included in the MAC PDU or a quantity of pieces of second data that is included in the MAC PDU.

Optionally, the first MAC subheader includes a ninth identifier, and the ninth identifier is used to indicate whether a first MAC subheader or first data is further encapsulated behind the first MAC subheader or the first data; and/or the second MAC subheader includes a tenth identifier, and the tenth identifier is used to indicate whether a second MAC subheader or second data is further encapsulated behind the second MAC subheader or the second data.

Optionally, the processing unit 1910 is specifically configured to:

generate the MAC PDU by preferentially encapsulating, into the MAC PDU, data whose latency requirement is less than or equal to a first threshold in the at least one piece of first data on the at least one first logical channel and the at least one piece of second data on the at least one second logical channel; or generate the MAC PDU by preferentially encapsulating, into the MAC PDU, data whose latency requirement is less than or equal to a second threshold in the at least one piece of first data on the at least one first logical channel; or generate the MAC PDU by preferentially encapsulating the at least one piece of first data on the at least one first logical channel into the MAC PDU.

It should be understood that the communications apparatus 1900 may correspond to the first communications device shown in FIG. 2, and the communications apparatus 1900 may include units configured to perform the method performed by the first communications device in FIG. 2. The units in the communications apparatus 1900 and the foregoing other operations and/or functions are separately used to implement corresponding procedures in the method shown in FIG. 2. A specific process in which the units perform the foregoing corresponding steps is described in detail in the foregoing method embodiment. For brevity, details are not described herein again.

Figure 20:
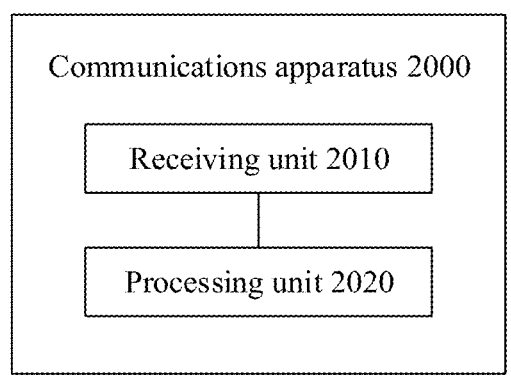
FIG. 20 is a schematic structural diagram of a communications apparatus according to another embodiment of this application.

FIG. 20 is a schematic structural diagram of a communications apparatus according to an embodiment of this application. A communications apparatus 2000 may include a receiving unit 2010 and a processing unit 2020. It should be understood that the communications apparatus 2000 shown in FIG. 20 is merely an example. The communications apparatus in this embodiment of this application may further include another module or unit, or include a unit with a function similar to that of each module in FIG. 20, or may not necessarily include all units in FIG. 20.

The receiving unit 2010 is configured to receive a MAC protocol data unit PDU through a direct link, where the MAC PDU includes first data on each of at least one first logical channel and second data on each of at least one second logical channel, and a service type or a destination address of the first data is different from a service type or a destination address of the second data.

The processing unit 2020 is configured to decapsulate the MAC PDU.

It should be understood that the communications apparatus 2000 may correspond to the receive end shown in FIG. 2, and the communications apparatus 2000 may include units configured to perform the method performed by the receive end in FIG. 2. The units in the communications apparatus 2000 and the foregoing other operations and/or functions are separately used to implement corresponding procedures in the method shown in FIG. 2. A specific process in which the units perform the foregoing corresponding steps is described in detail in the foregoing method embodiment. For brevity, details are not described herein again.

Figure 21:
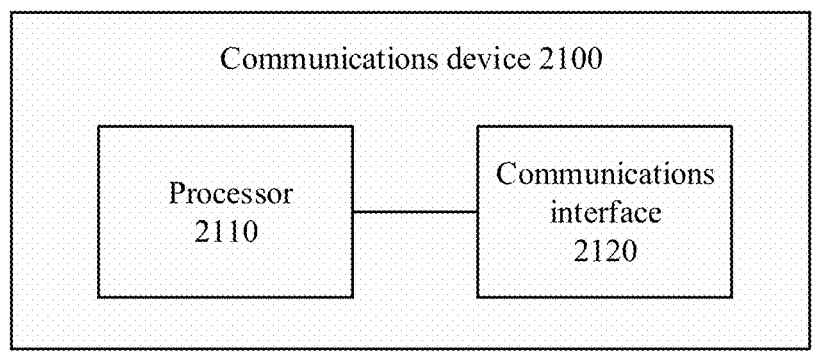
FIG. 21 is a schematic structural diagram of a communications device according to an embodiment of this application.

FIG. 21 is a schematic structural diagram of a communications device according to an embodiment of this application. It should be understood that the communications device 2100 shown in FIG. 21 is merely an example. The communications device in this embodiment of this application may further include another module or unit, or include a module with a function similar to that of each module in FIG. 21, or may not necessarily include all modules in FIG. 21.

The communications device 2100 includes at least one processor 2110 and a communications interface 2120. The communications device 2100 may be a first communications device, and the at least one processor 2110 executes a program instruction, so that the communications device 2100 implements a corresponding procedure of the method performed by the first communications device in FIG. 2. The communications device 2100 may alternatively be a receive end, and the at least one processor 2110 executes a program instruction, so that the communications device 2100 implements a corresponding procedure of the method performed by the receive end in FIG. 2.

Optionally, the communications device 2100 may further include a memory.

It should be understood that, the processor in this embodiment of this application may be a central processing unit (CPU), or the processor may be another general purpose processor, a digital signal processor (digital signal processor, DSP), an application-specific integrated circuit (ASIC), a field programmable gate array (FPGA), another programmable logic device, a discrete gate, a transistor logic device, a discrete hardware component, or the like. The general purpose processor may be a microprocessor, or the processor may be any conventional processor or the like.

It should be further understood that the memory in this embodiment of this application may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of random access memories (RAM) may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

Figure 22:
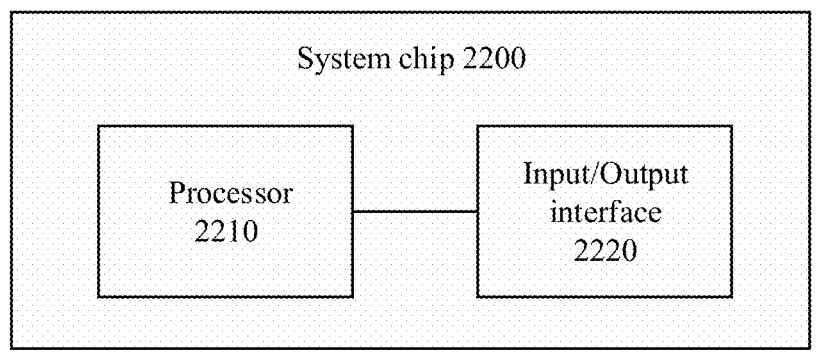
FIG. 22 is a schematic structural diagram of a system chip according to an embodiment of this application.

FIG. 22 is a schematic structural diagram of a system chip according to an embodiment of this application. It should be understood that a system chip 2200 shown in FIG. 22 is merely an example. The system chip in this embodiment of this application may further include another module or unit, or include a module with a function similar to that of each module in FIG. 22, or may not necessarily include all modules in FIG. 22.

The system chip 2200 includes at least one processor 2210 and an input/output interface 2220. The system chip 2200 may be a first communications device in the method shown in FIG. 2, and may implement a corresponding procedure of the method performed by the first communications device. Alternatively, the system chip 2200 may be a receive end in the method shown in FIG. 2, and may implement a corresponding procedure of the method performed by the receive end.

It should be understood that the processor in this application may be configured to implement functions of the processing unit in this application, and the input/output interface or the communications interface in this application may be configured to implement functions of the sending unit and/or the receiving unit in this application.

All or some of the foregoing embodiments may be implemented by using software, hardware, firmware, or any combination thereof. When software is used to implement the embodiments, the foregoing embodiments may be implemented completely or partially in a form of a computer program product. The computer program product includes one or more computer instructions or computer programs. When the program instructions or the computer programs are loaded and executed on a computer, the procedure or functions according to the embodiments of this application are all or partially generated. The computer may be a general purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a web site, computer, server, or data center to another web site, computer, server, or data center in a wired (for example, infrared, radio, or microwave) manner.

The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification usually represents an "or" relationship between the associated objects.

The terms "first", "second", and the like in this application are merely used to distinguish between different objects, and "first" and "second" do not limit an actual sequence or functions of objects modified by "first" and "second". Expressions such as "example", "for example", "such as", "optional design", and "a design" in this application are merely used to represent examples, instances, or descriptions. Any embodiment or design scheme described as "example", "for example", "such as", "optional design", or "a design" described in this application should not be construed as being more preferred or more advantageous than another embodiment or design scheme. Specifically, using these words is intended to present a related concept in detail.

Names may be assigned to various objects that may be involved in this application, such as various messages/information/devices/network elements/systems/apparatuses/actions/operations/procedures/concepts. It may be understood that these specific names do not constitute a limitation on the related objects, and the assigned names may change with a factor such as a scenario, a context, or a use habit. Technical meanings of technical terms in this application should be understood and determined mainly based on functions and technical effects that are of the technical terms and that are reflected/performed in the technical solutions.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application. A person of ordinary skill in the art may be aware that, in combination with the examples described in the embodiments disclosed in this specification, units and algorithm steps can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiment. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located at one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit.

When the functions are implemented in the form of a software function unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data transmission method, comprising:
obtaining, by a media access control (MAC) entity of a first communications device from an upper layer, first data on each of at least one first logical channel and second data on each of at least one second logical channel, wherein a service type or a destination address of the first data is different from a service type or a destination address of the second data;
generating, by the first communications device, a MAC protocol data unit (PDU), wherein the MAC PDU comprises the first data on each first logical channel and the second data on each second logical channel, wherein the MAC PDU comprises a first identifier and a second identifier, the first identifier indicates the service type or the destination address of the first data, and the second identifier indicates the service type or the destination address of the second data, and, the MAC PDU further comprising a first unit and a second unit, all content of the first unit is located before the second unit, the first unit and a second unit, all content of the first unit is on each first logical channel, and the second unit comprises the second identifier and the second data that is on each second logical channel, the MAC PDU further comprises a MAC control element, wherein
when the MAC control element is comprised in the first unit, the MAC control element is valid for at least one second communications device corresponding to the first identifier,
when the MAC control element is comprised in the second unit, the MAC control element is valid for at least one third communications device corresponding to the second identifier,
when the MAC control element is not comprised in the first unit and the second unit, the MAC control element is valid for both at least one second communications device and at least one third communications device, and
when the MAC control element is not comprised in the first unit and the second unit, the MAC control element is valid for all communications devices that receive the MAC PDU; and
sending, by the first communications device, the MAC PDU through a direct link to at least one of the second communications device and/or the at least one third communications device.

2. The method according to claim 1, wherein the first identifier is any one or more of the following associated with the first data: a first service type identifier, a first flow identifier, a first bearer identifier, a first group identifier, a first destination address identifier, and a first transmission requirement identifier; and the second identifier is any one or more of the following associated with the second data: a second service type identifier, a second flow identifier, a second bearer identifier, a second group identifier, a second destination address identifier, and a second transmission requirement identifier.

3. The method according to claim 1, wherein the MAC PDU comprises at least one first MAC subheader and at least one second MAC subheader, the at least one first MAC subheader is in a one-to-one correspondence with at least one piece of first data on the at least one first logical channel, and the at least one second MAC subheader is in a one-to-one correspondence with at least one piece of second data on the at least one second logical channel; and
the generating, by the first communications device, the MAC PDU comprises:
generating, by the first communications device, the MAC PDU by adjacently encapsulating the first data and a MAC subheader corresponding to the first data into the MAC PDU, by adjacently encapsulating the second data and a MAC subheader corresponding to the second data into the MAC PDU, or a combination thereof; or
generating, by the first communications device, the MAC PDU by adjacently encapsulating the at least one first MAC subheader into the MAC PDU and adjacently encapsulating the at least one piece of first data into the MAC PDU, by adjacently encapsulating the at least one second MAC subheader into the MAC PDU and adjacently encapsulating the at least one piece of second data into the MAC PDU, or a combination thereof.

4. The method according to claim 3, wherein:
the first MAC subheader comprises a ninth identifier, and the ninth identifier indicates whether a first MAC subheader or first data is further encapsulated behind the first MAC subheader or the first data;

the second MAC subheader comprises a tenth identifier, and the tenth identifier indicates whether a second MAC subheader or second data is further encapsulated behind the second MAC subheader or the second data; or a combination thereof.

5. The method according to claim 1, wherein the MAC PDU comprises a third identifier a fourth identifier, both the third identifier and the fourth identifier, and the third identifier, the fourth identifier, or both the third identifier and the fourth identifier indicate an identity or an address of the first communications device; and the generating, by the first communications device, the MAC PDU comprises:

generating, by the first communications device, the MAC PDU by encapsulating both the third identifier corresponding to the first data and the fourth identifier corresponding to the second data into the MAC PDU; or generating, by the first communications device, the MAC PDU by encapsulating the third identifier or the fourth identifier into the MAC PDU.

6. The method according to claim 1, wherein the MAC PDU comprises a fifth identifier, a sixth identifier, or both the fifth identifier and the sixth identifier; and the generating, by the first communications device, the MAC PDU comprises:

generating, by the first communications device, the MAC PDU by encapsulating the fifth identifier or the sixth identifier into the MAC PDU, wherein the fifth identifier or the sixth identifier indicates a format type of the MAC PDU; or generating, by the first communications device, the MAC PDU by encapsulating the fifth identifier or the sixth identifier into the MAC PDU, wherein the fifth identifier or the sixth identifier indicates a format type of an adjacent address field behind the fifth identifier or the sixth identifier in the MAC PDU; or generating, by the first communications device, the MAC PDU by encapsulating both the fifth identifier and the sixth identifier into the MAC PDU, wherein the fifth identifier indicates a format type of an address field corresponding to the first data, and the sixth identifier indicates a format type of an address field corresponding to the second data.

7. The method according to claim 6, wherein the format type is any one of the following:

a unicast format type, a multicast format type, a broadcast format type, a vehicle platooning service format type, a control information format type, a data format type, a MAC control element, and a fixed protocol version format type.

8. The method according to claim 1, wherein the MAC PDU comprises a seventh identifier, an eighth identifier, or both the seventh identifier and the eighth identifier, wherein the seventh identifier indicates a quantity of first logical channels that is comprised in the MAC PDU or a quantity of pieces of first data that is comprised in the MAC PDU, and the eighth identifier indicates a quantity of second logical channels that is comprised in the MAC PDU or a quantity of pieces of second data that is comprised in the MAC PDU.

9. The method according to claim 1, wherein the generating, by the first communications device, the MAC PDU comprises:

generating, by the first communications device, the MAC PDU by preferentially encapsulating, into the MAC PDU, data whose latency requirement is less than or equal to a first threshold in the at least one piece of first data on the at least one first logical channel and the at least one piece of second data on the at least one second logical channel; or generating, by the first communications device, the MAC PDU by preferentially encapsulating, into the MAC PDU, data whose latency requirement is less than or equal to a second threshold in the at least one piece of first data on the at least one first logical channel; or generating, by the first communications device, the MAC PDU by preferentially encapsulating the at least one piece of first data on the at least one first logical channel into the MAC PDU.

10. An apparatus comprising:

a memory; and one or more processors coupled to the memory, wherein the one or more processors are configured to:

obtain, by a media access control (MAC) entity of a first communications device from an upper layer, first data on each of at least one first logical channel and second data on each of at least one second logical channel, wherein a service type or a destination address of the first data is different from a service type or a destination address of the second data, generate, by the first communications device, a MAC protocol data unit (PDU), wherein the MAC PDU comprises the first data on each first logical channel and the second data on each second logical channel, wherein the MAC PDU comprises a first identifier and a second identifier, the first identifier indicates the service type or the destination address of the first data, and the second identifier indicates the service type or the destination address of the second data, and, the MAC PDU further comprising a first unit and a second unit, all content of the first unit is located before the second unit, the first unit and a second unit, all content of the first unit is on each first logical channel, and the second unit comprises the second identifier and the second data that is on each second logical channel, the MAC PDU further comprises a MAC control element, wherein when the MAC control element is comprised in the first unit, the MAC control element is valid for at least one second communications device corresponding to the first identifier, when the MAC control element is comprised in the second unit, the MAC control element is valid for at least one third communications device corresponding to the second identifier, when the MAC control element is not comprised in the first unit and the second unit, the MAC control element is valid for both at least one second communications device and at least one third communications device, and when the MAC control element is not comprised in the first unit and the second unit, the MAC control element is valid for all communications devices that receive the MAC PDU, and send, by the first communications device, the MAC PDU through a direct link to at least one of the second communications device and/or the at least one third communications device.

11. The apparatus according to claim 10, wherein the first identifier is any one or more of the following associated with the first data: a first service type identifier, a first flow identifier, a first bearer identifier, a first group identifier, a first destination address identifier, and a first transmission requirement identifier; and the second identifier is any one or more of the following associated with the second data: a second service type identifier, a second flow identifier, a second bearer identifier, a second group identifier, a second destination address identifier, and a second transmission requirement identifier.

12. The apparatus according to claim 10, wherein the MAC PDU comprises at least one first MAC subheader and at least one second MAC subheader, the at least one first MAC subheader is in a one-to-one correspondence with at least one piece of first data on the at least one first logical channel, and the at least one second MAC subheader is in a one-to-one correspondence with at least one piece of second data on the at least one second logical channel; and the generating, by the first communications device, the MAC PDU comprises:

generating, by the first communications device, the MAC PDU by adjacently encapsulating the first data and a MAC subheader corresponding to the first data into the MAC PDU, by adjacently encapsulating the second data and a MAC subheader corresponding to the second data into the MAC PDU, or a combination thereof; or generating, by the first communications device, the MAC PDU by adjacently encapsulating the at least one first MAC subheader into the MAC PDU and adjacently encapsulating the at least one piece of first data into the MAC PDU, by adjacently encapsulating the at least one second MAC subheader into the MAC PDU and adjacently encapsulating the at least one piece of second data into the MAC PDU, or a combination thereof.

13. The apparatus according to claim 10, wherein the MAC PDU comprises a third identifier, a fourth identifier, or both the third identifier and the fourth identifier, and the third identifier the fourth identifier, or the combination thereof indicates an identity or an address of the first communications device; and the generating, by the first communications device, the MAC PDU comprises:

generating, by the first communications device, the MAC PDU by encapsulating both the third identifier corresponding to the first data and the fourth identifier corresponding to the second data into the MAC PDU; or generating, by the first communications device, the MAC PDU by encapsulating the third identifier or the fourth identifier into the MAC PDU.

14. The apparatus according to claim 10, wherein the MAC PDU comprises a fifth identifier, a sixth identifier, or both the fifth identifier and the sixth identifier; and the generating, by the first communications device, the MAC PDU comprises:

generating, by the first communications device, the MAC PDU by encapsulating the fifth identifier or the sixth identifier into the MAC PDU, wherein the fifth identifier or the sixth identifier indicates a format type of the MAC PDU; or generating, by the first communications device, the MAC PDU by encapsulating the fifth identifier or the sixth identifier into the MAC PDU, wherein the fifth identifier or the sixth identifier indicates a format type of an adjacent address field behind the fifth identifier or the sixth identifier in the MAC PDU; or generating, by the first communications device, the MAC PDU by encapsulating both the fifth identifier and the sixth identifier into the MAC PDU, wherein the fifth identifier indicates a format type of an address field corresponding to the first data, and the sixth identifier indicates a format type of an address field corresponding to the second data.

\* \* \* \* \*

UNITED STATES PATENT AND TRADEMARK OFFICE
CERTIFICATE OF CORRECTION

PATENT NO. : 11,653,412 B2
APPLICATION NO. : 17/023121
DATED : May 16, 2023
INVENTOR(S) : Mingchao Li et al.

It is certified that error appears in the above-identified patent and that said Letters Patent is hereby corrected as shown below:

In the Claims

Claim 1, Column 32, Lines 2 and 3, delete "the first unit and a second unit, all content of the first unit is on" and insert --the first unit compromises the first identifier and the first data that is on--.

Claim 5, Column 33, Line 12, delete "and" and insert --an--.

Claim 10, Column 34, Lines 41 and 42, delete "the first unit and a second unit, all content of the first unit is on" and insert --the first unit compromises the first identifier and the first data is on--.

Signed and Sealed this
Eighth Day of August, 2023

Katherine Kelly Vidal
*Director of the United States Patent and Trademark Office*